United States Patent
Ando et al.

(10) Patent No.: US 10,806,272 B2
(45) Date of Patent: Oct. 20, 2020

(54) MATTRESS CORE MATERIAL AND BED MATTRESS

(71) Applicant: AIRWEAVE Inc., Obu-shi, Aichi (JP)

(72) Inventors: Tsuyoshi Ando, Aichi (JP); Masakazu Kojima, Aichi (JP); Motokuni Takaoka, Aichi (JP)

(73) Assignee: AIRWEAVE INC., Aichi (JP)

( * ) Notice: Subject to any disclaimer, the term of this patent is extended or adjusted under 35 U.S.C. 154(b) by 131 days.

(21) Appl. No.: 16/096,340

(22) PCT Filed: Jun. 8, 2017

(86) PCT No.: PCT/JP2017/021400
§ 371 (c)(1),
(2) Date: Oct. 25, 2018

(87) PCT Pub. No.: WO2018/003456
PCT Pub. Date: Jan. 4, 2018

(65) Prior Publication Data
US 2019/0125092 A1    May 2, 2019

(30) Foreign Application Priority Data
Jun. 30, 2016   (JP) .................................. 2016-131174

(51) Int. Cl.
*A47C 27/00*    (2006.01)
*A47C 27/12*    (2006.01)
(Continued)

(52) U.S. Cl.
CPC .......... *A47C 27/001* (2013.01); *A47C 27/122* (2013.01); *A47C 31/006* (2013.01); *B32B 5/26* (2013.01); *B32B 5/22* (2013.01)

(58) Field of Classification Search
CPC ....... A47C 31/006; A47C 31/00; A47C 27/12; A47C 27/122; A47C 21/04; A47C 21/042;
(Continued)

(56) References Cited

U.S. PATENT DOCUMENTS 4,859,516 A * 8/1989 Yamanaka ................ B32B 5/26
    428/92
4,913,757 A * 4/1990 Yamanaka ......... A47G 27/0212
    156/167
(Continued)

FOREIGN PATENT DOCUMENTS

| CN | 1706320 A | 12/2005 |
|---|---|---|
| CN | 1819788 A | 8/2006 |

(Continued)

OTHER PUBLICATIONS

International Search Report PCT/ISA/210 for International Application No. PCT/JP2017/021400 Dated Jul. 4, 2017.
(Continued)

*Primary Examiner* — Robert G Santos
(74) *Attorney, Agent, or Firm* — Harness, Dickey & Pierce, P.L.C.

(57) ABSTRACT

A mattress core material includes a plurality of flat cushion bodies stacked in a thickness direction thereof, including at least a first cushion body which becomes an upper part when using the mattress core material; and a second cushion body which becomes a lower part when using the mattress core material, the first and second cushion bodies including a three-dimensional filaments-linked structure, the first and second cushion bodies each including a high-density upper surface layer having high filament density, formed in an upper surface layer region; a high-density lower surface layer having high filament density, formed in a lower surface layer region; and a low-density elastic layer formed between
(Continued)

the high-density upper surface layer and the high-density lower surface layer, the low-density elastic layer being lower in filament density than each high-density surface layer, a intermediate position in the thickness direction of the mattress core material in which the first and second cushion bodies are stacked as upper and lower parts in the thickness direction, respectively, the high-density intermediate layer having a function of distributing a vertically applied compressive stress, along a curvature of an interface between the first and second cushion bodies in the high-density intermediate layer.

7 Claims, 11 Drawing Sheets

(51) Int. Cl.
   *A47C 31/00* (2006.01)
   *B32B 5/26* (2006.01)
   *B32B 5/22* (2006.01)
(58) Field of Classification Search
   CPC ..... A47C 21/046; A47C 27/001; A47C 27/00;
             B32B 7/02; B32B 7/12; B32B 27/08;
             B32B 27/32; B32B 5/22; B32B 5/24;
                                        B32B 5/26
   USPC ........ 5/727, 728, 724, 690, 691, 652.1, 652;
                                        428/171, 212, 218
   See application file for complete search history.

(56) References Cited

U.S. PATENT DOCUMENTS

| | | | | |
|---|---|---|---|---|
| 4,952,265 A * | 8/1990 | Yamanaka | ......... | A47G 27/0212 156/167 |
| 5,464,491 A * | 11/1995 | Yamanaka | ............... | D04H 3/02 156/167 |
| 5,639,543 A * | 6/1997 | Isoda | ....................... | D04H 3/03 428/220 |
| 6,347,790 B1 * | 2/2002 | Nishibori | .............. | E01F 15/145 267/146 |
| 7,377,762 B2 * | 5/2008 | Nishibori | ................. | D04H 3/03 425/71 |
| 7,622,179 B2 * | 11/2009 | Patel | ........................ | D04H 1/02 428/92 |
| 7,625,629 B2 * | 12/2009 | Takaoka | .................. | B29C 43/02 428/220 |
| 7,993,734 B2 * | 8/2011 | Takaoka | .................. | B29C 43/02 428/218 |
| 8,226,882 B2 * | 7/2012 | Takaoka | .................. | B29C 43/22 264/622 |
| 8,277,210 B2 * | 10/2012 | Takaoka | .................. | B29C 43/22 425/71 |
| 8,563,121 B2 * | 10/2013 | Takaoka | .................. | B29C 43/22 428/218 |
| 8,563,123 B2 * | 10/2013 | Takaoka | .................. | B29C 43/22 428/220 |
| 8,568,635 B2 * | 10/2013 | Takaoka | .................. | B29C 43/22 264/171.2 |
| 8,721,825 B2 * | 5/2014 | Takaoka | .................... | D04H 3/14 156/242 |
| 8,757,996 B2 * | 6/2014 | Takaoka | .................. | B29C 43/22 425/71 |
| 8,828,293 B2 * | 9/2014 | Takaoka | .................. | B29C 43/22 264/165 |
| 9,169,585 B2 * | 10/2015 | Takaoka | .................. | B29C 48/08 |
| 9,174,404 B2 * | 11/2015 | Takaoka | .................. | B29C 48/07 |
| 9,194,066 B2 * | 11/2015 | Takaoka | .................. | B29C 48/07 |
| 9,334,593 B2 * | 5/2016 | Sasaki | .................... | B29B 13/04 |
| 9,440,390 B2 * | 9/2016 | Takaoka | .................. | B29C 48/05 |
| 9,528,209 B2 * | 12/2016 | Takaoka | .................. | D01D 10/00 |
| 9,561,612 B2 * | 2/2017 | Takaoka | .................. | B29C 48/05 |
| 9,598,803 B2 * | 3/2017 | Takaoka | .................. | D04H 3/14 |
| 9,615,670 B2 * | 4/2017 | Takaoka | .................. | B32B 5/18 |
| 9,918,559 B2 * | 3/2018 | Osaki | .................... | A47C 31/006 |
| 9,918,560 B2 * | 3/2018 | Osaki | .................... | A47C 31/006 |
| 10,233,073 B2 * | 3/2019 | Takaoka | .................. | A47C 27/12 |
| 10,266,977 B2 * | 4/2019 | Takaoka | .................. | B29C 48/07 |
| 10,328,618 B2 * | 6/2019 | Takaoka | .................. | B29C 48/30 |
| 2003/0092335 A1 * | 5/2003 | Takaoka | ............... | D04H 13/002 442/1 |
| 2006/0116045 A1 * | 6/2006 | Nishibori | ................ | B29C 48/05 442/338 |
| 2006/0198983 A1 * | 9/2006 | Patel | ........................ | D04H 1/02 428/92 |
| 2007/0001336 A1 | 1/2007 | Nishibori et al. | | |
| 2009/0108494 A1 | 4/2009 | Ito et al. | | |
| 2009/0269570 A1 * | 10/2009 | Takaoka | ................ | B29C 48/345 428/222 |
| 2009/0269571 A1 * | 10/2009 | Takaoka | .................. | B29C 48/78 428/222 |
| 2011/0316185 A1 * | 12/2011 | Takaoka | ................ | B29C 48/345 264/112 |
| 2012/0042452 A1 * | 2/2012 | Takaoka | ................ | A47C 31/006 5/691 |
| 2012/0104646 A1 * | 5/2012 | Takaoka | .................. | B29C 48/30 264/165 |
| 2012/0180939 A1 * | 7/2012 | Takaoka | .................. | B29C 48/05 156/181 |
| 2012/0301701 A1 * | 11/2012 | Takaoka | ................ | B29C 48/001 428/222 |
| 2012/0319323 A1 * | 12/2012 | Takaoka | .................... | D01D 5/12 264/210.1 |
| 2012/0328722 A1 * | 12/2012 | Takaoka | ............... | B29C 48/0255 425/71 |
| 2013/0020016 A1 * | 1/2013 | Takaoka | .................... | D04H 3/14 156/166 |
| 2013/0161858 A1 | 6/2013 | Sasaki | | |
| 2013/0189472 A1 | 7/2013 | Takaoka | | |
| 2014/0035191 A1 * | 2/2014 | Takaoka | ................ | B29C 48/001 264/210.8 |
| 2014/0037907 A1 * | 2/2014 | Takaoka | .................. | B29C 48/07 428/171 |
| 2014/0037908 A1 * | 2/2014 | Takaoka | ................. | D04H 3/077 428/171 |
| 2014/0138016 A1 * | 5/2014 | Takaoka | ............. | B29D 99/0092 156/180 |
| 2014/0370769 A1 * | 12/2014 | Osaki | .................... | A47C 27/122 442/1 |
| 2014/0378015 A1 * | 12/2014 | Osaki | .................... | A47C 31/006 442/1 |
| 2015/0197056 A1 * | 7/2015 | Takaoka | .................. | B29C 48/345 264/211.18 |
| 2015/0284894 A1 * | 10/2015 | Takaoka | ................ | B65B 31/047 442/50 |
| 2016/0023387 A1 * | 1/2016 | Takaoka | .................. | B29C 43/34 442/1 |
| 2016/0032506 A1 * | 2/2016 | Takaoka | ............... | B29C 48/0255 428/171 |
| 2016/0144756 A1 | 5/2016 | Ito et al. | | |
| 2016/0157628 A1 * | 6/2016 | Khambete | ............ | A47C 27/148 5/652 |
| 2016/0174725 A1 | 6/2016 | Takaoka | | |
| 2016/0263802 A1 * | 9/2016 | Takaoka | .................. | D04H 3/037 |
| 2018/0086623 A1 * | 3/2018 | Takaoka | ................ | B29C 48/345 |
| 2019/0125092 A1 * | 5/2019 | Ando | ....................... | D04H 3/03 |

FOREIGN PATENT DOCUMENTS

| | | | | |
|---|---|---|---|---|
| CN | 101415353 A | 4/2009 | | |
| CN | 102959151 A | 3/2013 | | |
| CN | 103328711 A | 9/2013 | | |
| CN | 105377078 A | 3/2016 | | |
| CN | 105377083 A | 3/2016 | | |
| JP | 2004-218116 A | 8/2004 | | |
| JP | 2005/223630 A | 8/2005 | | |
| JP | 2008113798 A | * 5/2008 | ............. | A47C 27/22 |
| JP | 2010-279687 A | 12/2010 | | |

(56) References Cited

FOREIGN PATENT DOCUMENTS

| | | |
|---|---|---|
| JP | 2014-64768 A | 4/2014 |
| JP | 2014-168683 A | 9/2014 |
| JP | 2016-28900 A | 3/2016 |
| WO | WO-2012/035736 A1 | 3/2012 |
| WO | WO-2012/157289 A1 | 11/2012 |
| WO | WO-2015/125497 A1 | 8/2015 |

OTHER PUBLICATIONS

International Preliminary Report on Patentability and English translation thereof dated Jan. 10, 2019.
Japanese Office Action and English translation thereof dated Aug. 20, 2019.
Japanese Office Action and English translation thereof dated Mar. 3, 2020.
Office Action for Chinese Patent Application No. 201780022748.3 dated May 15, 2020 and English concise explanation thereof.
Japanese Office Action for Japanese Patent Application No. 2018-525011 and English translation thereof dated Jul. 7, 2020.

* cited by examiner

25% press

50% press

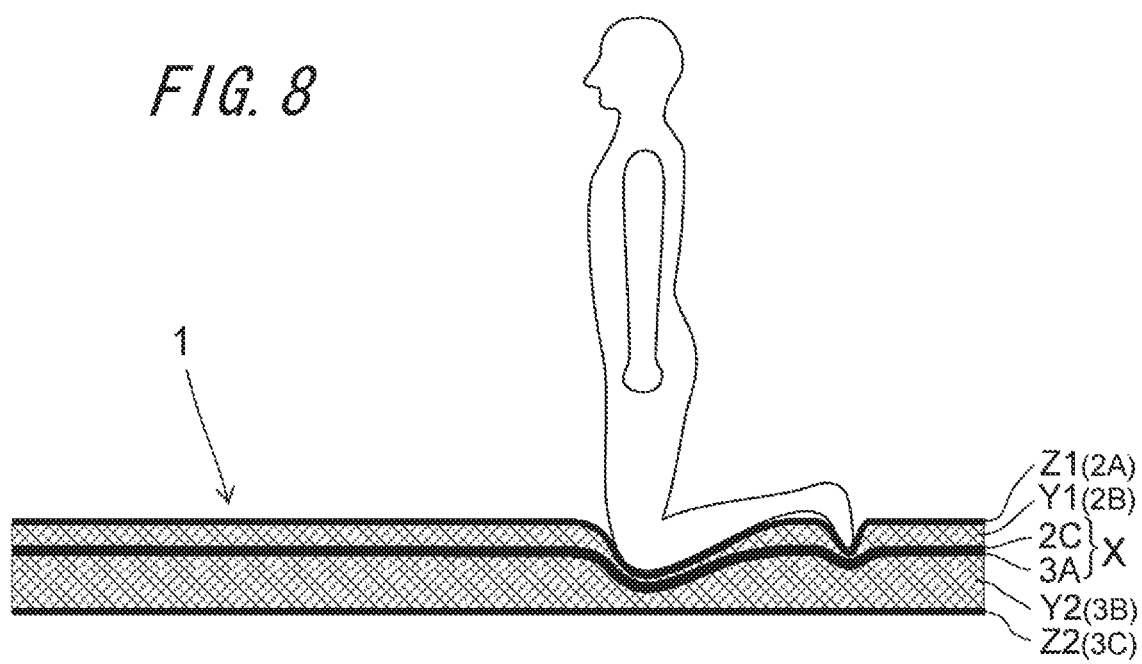

MATTRESS CORE MATERIAL AND BED MATTRESS

TECHNICAL FIELD

The present invention relates to a mattress core material and a bed mattress that utilize a three-dimensional filaments-linked structure.

BACKGROUND ART

As a core material used for an overlay mattress, or mattress pad, which is laid over an existing mattress or Japanese futon to get more comfortable sleeping, attention is being given to a structure obtained by linking a plurality of thermoplastic resin fibers in melted condition (melted filaments) together into a three-dimensional net-like form, which may hereafter be referred to as "3DF" (3-dimensional filaments-linked structure).

The three-dimensional filaments-linked structure is obtained by extruding a thermoplastic resin material such as polyethylene or polypropylene from an extruder through a plurality of discharge orifices into filaments, twining and fusion-linking the filaments together into a three-dimensional net, and providing rapid cooling for the filaments in net form (refer to Patent Literature 1).

CITATION LIST

Patent Literature

Patent Literature 1: WO 2012/035736

SUMMARY OF INVENTION

Technical Problem

In the case where the three-dimensional filaments-linked structure having the above-described feature whose thickness is increased, is used as an alternative to a core material for a traditional bed mattress composed of a metallic spring or coil, for example, when a user sits up with his/her knee or elbow pressed against the mattress, the mattress core material is locally subjected to great pressure, and, the local area of the material under compression may inconveniently be brought into contact with the main body of a bed (such as a floor board or a top board of the bed).

This contact is caused when a part of user's body which is relatively sharp-pointed, for example, the semispherical shaped front end of user's knee measuring about 10 cm in diameter, presses part of the mattress down deeply. A part of the mattress subjected to the pressing action of the knee is deformed into an inverted cone-like deep depression, and, abutment of the front end of this depression (corresponding to user's knee cap) against a hard part such as the top board causes the user to feel as if his/her knee is hitting a floor with pain or a sense of discomfort.

For example, a way to reduce such a hitting-a-floor feeling is to increase the repulsion force (spring constant according to Hooke's Law) of the mattress by increasing the diameter of each melted filament of the three-dimensional filaments-linked structure or increasing the filament density. However, a mattress having an unduly high repulsion force is hard and less deformable, and thus fails to distribute body pressure properly.

Another way to reduce the hitting-a-floor feeling is to increase the thickness of the mattress. However, an increase in the thickness of the mattress (three-dimensional filaments-linked structure) entails an increase in the size and weight of the mattress, and, the transportation and installation operation of such a large and heavy mattress is cumbersome.

Furthermore, in the case where the thickness of the three-dimensional filaments-linked structure is increased, when the uppermost layer of the three-dimensional filaments-linked structure is deformed into a deep recess (like an inverted cone, for example), the filaments constituting the uppermost layer are greatly stretched, and consequently the fusion-linked points of the filaments tend to be torn apart. This may cause deterioration in the repulsion force of the mattress.

An object of the invention is to provide a mattress core material and a bed mattress that achieve minimization of the hitting-a-floor feeling even under heavy locally applied load without having to have unduly high repulsion force in the mattress as a whole and unduly large mattress thickness.

Solution to Problem

The invention provides a mattress core material comprising:
a plurality of flat cushion bodies stacked in a thickness direction thereof, comprising at least
a first flat cushion body which becomes an upper part during use; and
a second flat cushion body which becomes a lower part during use,
the first flat cushion body and the second flat cushion body comprising a three-dimensional filaments-linked structure in which filaments formed of a melted thermoplastic resin are linked together into a three-dimensional net form,
the first flat cushion body and the second flat cushion body each comprising
a high-density upper surface layer having high filament density, formed in an upper surface layer region in the thickness direction;
a high-density lower surface layer having high filament density, formed in a lower surface layer region in the thickness direction; and
a low-density elastic layer formed between the high-density upper surface layer and the high-density lower surface layer, the low-density elastic layer being lower in filament density than each high-density surface layer,
in the mattress core material in which the first flat cushion body and the second flat cushion body are stacked as upper and lower parts in the thickness direction, respectively, the high-density lower surface layer of the first flat cushion body and the high-density upper surface layer of the second flat cushion body constituting a high-density intermediate layer in an intermediate position of the mattress core material in the thickness direction,
the high-density intermediate layer serving as a stress distribution layer which distributes a vertically applied compressive stress, along a curvature of an interface between the first flat cushion body and the second flat cushion body in the high-density intermediate layer.

In the mattress core material of the invention, it is preferable that the high-density surface layer exhibits a rate of compressive deformation of greater than 0% but less than 25%, which is a result obtained by measurement using the following testing method (A).

(A) a Compressive Deformation Rate
A sample is prepared by cutting a 2 mm-thick, horizontally sliced piece of the high-density surface layer into a square which is 100 mm on a side, and a measured thickness of the sample in uncompressed condition is defined as a thickness L1 (mm). A loading element having a 100 mm square shaped pressurizing plate at a front end thereof is placed on an upper surface of the sample, with the pressurizing plate snugly aligned with the upper surface. A load of 200 N is applied to the loading element to determine a thickness L2 (mm) of the sample at the load. A percentage of variation in thickness under the planar load $[\{(L1-L2)/(L1)\}\times 100]$ is defined as the compressive deformation rate (%).

In the mattress core material of the invention, it is preferable that the high-density surface layer exhibits an elongation deformation amount of greater than or equal to 10 mm but less than or equal to 150 mm, which is a result obtained by measurement using the following testing method (B).

(B) An Elongation Deformation Amount

A sample is prepared by cutting a 2 mm-thick, horizontally sliced piece of the high-density surface layer into a 400 mm diameter circle. The sample is retained between a pair of frame-like plates, each having a 300 mm diameter circular opening, so that part of the sample is exposed in a form of a 300 mm diameter circle (2 mm in thickness) inside the frame to prepare a test piece. A loading element having a 20 mm diameter circular pressurizing plate at a front end thereof is brought into contact with a center of an upper surface of the circular sample inside the frame. A load of 100 N is applied to the loading element to deform a central area of the circular sample into a concave recess (an inverted cone). In this condition, a sag amount L3 (mm) of the central area of the circular sample from a level of the frame is measured from a side of the test piece. The sag amount L3 is defined as the elongation deformation amount (mm).

In the mattress core material of the invention, it is preferable that an apparent density of the high-density surface layer obtained by calculation using the following equation (1) falls in a range of 60 kg/m$^3$ to 300 kg/m$^3$, and an apparent density of the low-density elastic layer obtained by calculation using the following equation (1) falls in a range of 30 kg/m$^3$ to 155 kg/m$^3$, and a mean apparent density of the upper first flat cushion body obtained by calculation using the following equation (1) falls in a range of 35 kg/m$^3$ to 150 kg/m$^3$, and a mean apparent density of the lower second flat cushion body obtained by calculation using the following equation (1) falls in a range of 35 kg/m$^3$ to 150 kg/m$^3$, and $$G=w/(v\times d\times h) \quad (1),$$

wherein G represents apparent density (kg/m$^3$), w represents sample mass (kg), v represents sample width (m), d represents sample depth (m), and h represents sample height (m).

In the mattress core material of the invention, it is preferable that the mattress core material in which the first flat cushion body and the second flat cushion body are stacked in the thickness direction, exhibits a repulsion force under compression at planar load of greater than or equal to 100 N but less than or equal to 400 N, which is a result obtained by measurement using the following testing method (C), and exhibits an index of repulsion force at local load of greater than or equal to 2.5 but less than or equal to 6.5, which is a result obtained by measurement using the following method (D).

(C) A Repulsion Force Under Compression at Planar Load

A sample is cut from the mattress core material in a direction parallel to the thickness direction in a form of a rectangular prism having a 150 mm square shaped upper surface (top face), A loading element having a 150 mm square shaped pressurizing plate at a front end thereof is placed on the upper surface of the sample, with the pressurizing plate snugly aligned with the upper surface. A load of 5 N is applied to the loading element to determine an initial thickness L4 (mm) of the sample at the load of 5 N. The sample is compressed in the thickness direction by increasing the load applied to the loading element at a rate of 20 N per second. Upon detection of a 15 mm decrease of the thickness (mm) of the compressed sample from the initial thickness L4, expressed differently, when the thickness reaching a [L4−15] level, a value of a load L5 (N) applied to the loading element if recorded. The load value L5 is defined as the repulsion force under compression at planar load (N).

(D) An Index of Repulsion Force at Local Load

A sample is cut from the mattress core material in a direction parallel to the thickness direction in a form of a rectangular prism having a 300 mm square shaped upper surface (top face). A cylindrical loading element having a 50 mm diameter front end is brought into contact with a center of the upper surface of the sample. A load of 5 N is applied to the loading element to determine an initial thickness L6 (mm) of the sample. The sample is compressed in the thickness direction by increasing the load applied to the loading element at a rate of 20 N per second. Upon detection of a 25% decrease of the thickness (mm) of the compressed sample from the initial thickness L6, expressed differently, when the thickness reaching a [L6×0.75] level, a value of a load L7 applied to the loading element is recorded as a repulsion force under 25% compression at local load (N). Upon further detection of a 50% decrease of the thickness (mm) of the compressed sample from the initial thickness L6, expressed differently, when the thickness reaching a [L6×0.5] level, a value of a load L8 (N) applied to the loading element is recorded as a repulsion force under 50% compression at local load (N). A ratio of the repulsion force under 50% compression at local load L8 (N) to the repulsion force under 25% compression at local load L7 (N) [L8/L7] is defined as the index of repulsion force at local load.

The invention provides a bed mattress comprising:
the mattress core materials of the invention stacked in the thickness direction; and
a cover which receives the mattress core materials.

In the bed mattress of the invention, it is preferable that the bed mattress in which the first flat cushion body and the second flat cushion body are stacked in the thickness direction, with the cover lying in between, exhibits a repulsion force under compression at planar load of greater than or equal to 100 N but less than or equal to 400 N, which is a result of measurement using the following testing method (E), and exhibits an index of repulsion force at local load of greater than or equal to 2.5 but less than or equal to 6.5, which is a result of measurement using the following testing method (F).

(E) A Repulsion Force Under Compression at Planar Load

A sample is cut from the mattress core material with the cover inclusive vertically in the thickness direction in a form of a rectangular prism having a 150 mm square shaped upper surface (top face). A loading element having a 150 mm square shaped pressurizing plate at a front end thereof is placed on the upper surface of the sample, with the pressurizing plate snugly aligned with the upper surface. A load of 5 N is applied to the loading element to determine an initial thickness L9 (mm) of the sample. The sample is compressed in the thickness direction by increasing the load applied to the loading element at a rate of 20 N per second. Upon detection of a 15 mm decrease of the thickness (mm) of the compressed sample from the initial thickness L9, expressed differently, when the thickness reaching a [L9−15] level, a value of a load L10 (N) applied to the loading element is recorded. The load value L10 is defined as the repulsion force under compression at planar load (N).

(F) An Index of Repulsion Force at Local Load

A sample is cut from the mattress core material with the cover inclusive vertically in the thickness direction in a form of a rectangular prism having a 300 mm square shaped upper surface (top face). A cylindrical loading element having a 50 mm diameter front end is brought into contact with a center of the upper surface of the sample. A load of 5 N is applied to the loading element to determine an initial thickness L11 (mm) of the sample. The sample is compressed in the thickness direction by increasing the load applied to the loading element at a rate of 20 N per second. Upon detection of a 25% decrease of the thickness (mm) of the compressed sample from the initial thickness L11, expressed differently, when the thickness reaching a [L11×0.75] level, a value of a load L12 applied to the loading element is recorded as a repulsion force under 25% compression at local load (N). Upon further detection of a 50% decrease of the thickness (mm) of the compressed sample from the initial thickness L11, expressed differently, when the thickness reaching a [L6×0.5] level, a value of a load L13 (N) applied to the loading element is recorded as a repulsion force under 50% compression at local load (N). A ratio of the repulsion force under 50% compression at local load L13 (N) to the repulsion force under 25% compression at local load L12 (N) [L13/L12] is defined as the index of repulsion force at local load.

Advantageous Effects of Invention

In the mattress core material pursuant to the invention, in an intermediate position of the low-density elastic layer constituting the main part of the core material in the thickness direction (in a location close to the center of the material), there is provided the high-density intermediate layer having high filament density that undergoes little thickness-wise compressive deformation under a load and accommodates the load by its entire bending deformation (curvature). Thus, even under a local heavy load, such as an impingement of user's knee or elbow on the main body (floor board or top board) of a bed, etc. employing a mattress core material of conventional design, which hardly occurs during normal use for sleeping purposes, in the mattress core material having structural features of the invention, this unduly high load (vertically applied compressive load), now applied to the high-density upper surface layer of the first flat cushion body (upper cushion body) that is an outer layer in the thickness direction making contact with user's body, is distributed in the direction of the plane of the high-density upper surface layer (the direction of body pressure-bearing surface, viz., the direction of an interface between the upper and lower cushion bodies) by the bending deformation of the layer, and, the distributed load is transmitted to the low-density elastic layer located below in the thickness direction.

Subsequently, as the influence of the described bending deformation is being exerted on the high-density intermediate layer located intermediate the mattress core material in the thickness direction thereof, the high-density intermediate layer accommodates the load in its entirety. The load is further distributed in width and length directions of the mattress core material, viz., the direction of the interface between the upper and lower cushion bodies, by the bending deformation of the layer in itself, and is then transmitted to the low-density elastic layer of the second flat cushion body (lower cushion body) in the thickness direction (refer to FIG. 8). That is, the unduly heavy load is distributed in the interfacial direction effectively in two stages, and can thus be accommodated over a wide area without causing part of user's body such as his/her knee to abut against the main body (top board) of a bed, etc. Thus, the mattress core material of the invention achieves minimization of the hitting-a-floor feeling without having to have unduly high hardness and elasticity that impair the advantageous effects of comfortable sleeping on a soft mattress and adequate body pressure distribution.

Moreover, one of the mattress core materials of the invention in which the compressive deformation rate of the high-density surface layer obtained by measurement using the testing method (A) is less than 25% and/or the elongation deformation amount of the high-density surface layer obtained by measurement using the testing method (B) is greater than or equal to 10 mm but less than or equal to 150 mm, in particular, is advantageous in that, even if a sharp-pointed deep depression such as an inverted cone-like depression, which is assumed to measure about 100 mm in depression diameter, appears due to the pressing action of user's knee or elbow, the occurrence of "hitting-a-floor feeling" due to abutment of the front end of this depression against the top board, etc., of a bed can be reduced more reliably. As another advantage, where a depression occurring in this mattress core material is as small as one caused by a light, body-pressure level load as distinct from the inverted cone-like deep depression, the effect of comfortable sleeping on a soft place (with low repulsion force) inherent in the three-dimensional filaments-linked structure can be maintained.

Moreover, one of the mattress core materials of the invention in which the apparent density of the high-density surface layer obtained by calculation using the equation (1) falls in the range of 60 kg/m$^3$ to 300 kg/m$^3$ and the apparent density of the low-density elastic layer obtained by calculation using the equation (1) falls in the range of 35 kg/m$^3$ to 155 kg/m$^3$, and, the mean apparent density of the upper first flat cushion body obtained by calculation using the equation (1) falls in the range of 30 kg/m$^3$ to 150 kg/m$^3$ and the mean apparent density of the lower second flat cushion body obtained by calculation using the equation (1) falls in a range of 30 kg/m$^3$ to 150 kg/m$^3$, in particular, achieves minimization of the "hitting-a-floor feeling" without having to have an unduly large weight.

Moreover, that one of the mattress core materials of the invention in which, in the condition where the first flat cushion body and the second flat cushion body are stacked in the thickness direction, the repulsion force under compression at planar load obtained by measurement using the testing method (C) is greater than or equal to 100 N but less than or equal to 400 N, and the index of repulsion force at local load obtained by measurement using the testing method (D) is greater than or equal to 2.5 but less than or equal to 6.5, in particular, minimizes "hitting-a-floor feeling" caused by local depression more reliably, while maintaining the effect of comfortable sleeping on a soft place (with low repulsion force) inherent in the three-dimensional filaments-linked structure.

The bed mattress, which comprises the mattress core materials of the invention stacked in the thickness direction and the cover which receives the mattress core materials, has the advantage of being able to produce a mattress for bed by combining mattress core materials of varying specifications together with facility.

As another advantage of the bed mattress of the invention, only one of the received mattress core materials which gets dirty or is flattened can be replaced with ease. Thus, the bed mattress so constructed affords easy maintainability and higher general durability, and is also conducive to a reduction in running costs.

Moreover, one of the bed mattresses of the invention in which, in the condition where the first flat cushion body and the second flat cushion body are stacked in the thickness direction, the repulsion force under compression at planar load obtained by measurement using the testing method (E) is greater than or equal to 100 N but less than or equal to 400 N, and the index of repulsion force at local load obtained by measurement using the testing method (F) is greater than or equal to 2.5 but less than or equal to 6.5, in particular, minimizes "hitting-a-floor feeling" caused by local depression, while maintaining the effect of comfortable sleeping on a soft place (with low repulsion force) inherent in the three-dimensional filaments-linked structure in spite of its having the cover.

BRIEF DESCRIPTION OF DRAWINGS

The objects, features, and advantages of the invention will become more apparent by reference to the following detailed description in conjunction with the accompanying drawings.

FIG. 8 is a drawing for explaining a condition where a person is standing with his/her knees on the mattress core material according to the first embodiment;

DESCRIPTION OF EMBODIMENTS

Figure 1A:
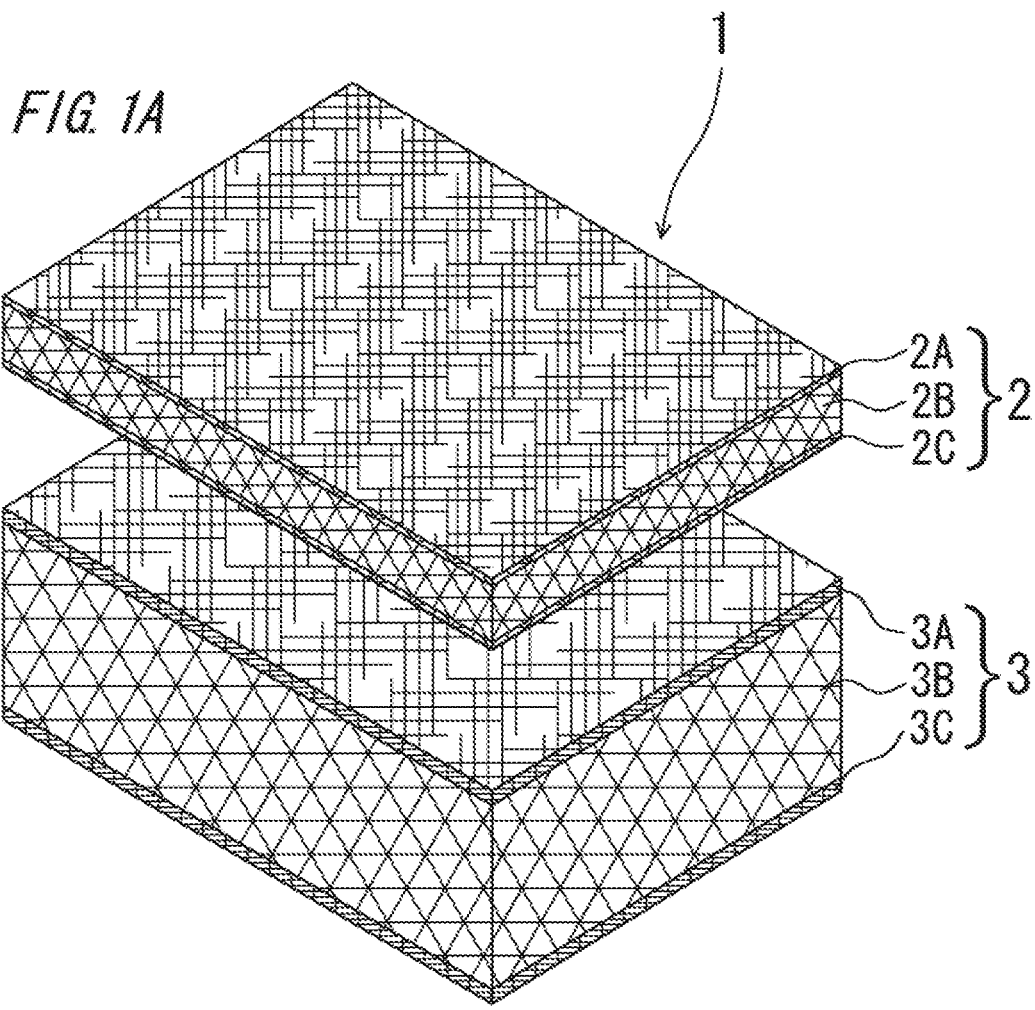
FIG. 1A and FIG. 1B are an exploded perspective view and an end view, respectively, that show the design of a mattress core material in accordance with the first embodiment of the invention.
Figure 1B:
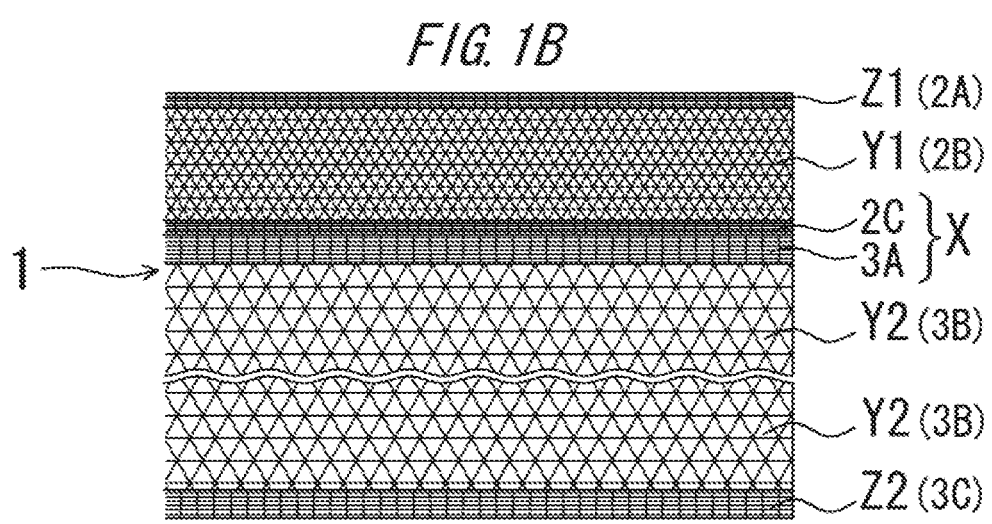

Referring now to the drawings, preferred embodiments of the invention will be described in detail. FIG. 1A is an exploded perspective view of a bed mattress in accordance with the first embodiment of the invention, and FIG. 1B is a schematic end view showing the structure of the bed mattress in enlarged dimension. In the drawings, the thickness of each mattress layer is represented with a touch of exaggeration.

As shown in the exploded perspective view in FIG. 1A, a bed mattress 1 according to the embodiment comprises two vertically stacked mattress core materials, namely a first cushion body 2 and a second cushion body 3. The bed mattress covered with a mattress cover will be described later by way of the third embodiment (refer to FIG. 10A).

Moreover, as shown in FIG. 1B, the bed mattress 1 according to the embodiment, in the form of a finished product constructed of the integrally stacked two mattress core materials, has a multilayer structure comprising, in order from the surface of the mattress which supports a sleeping user (in top-to-bottom order in the drawing), a body-pressure support surface layer (a high-density upper surface layer) Z1, an upper elastic layer (a low-density elastic layer) Y1, a high-density intermediate layer X (a combination of a high-density lower surface layer of the first cushion body 2 and a high-density upper surface layer of the second cushion body 3), a lower elastic layer (a low-density elastic layer) Y2, and a back-side support layer (a high-density lower surface layer) Z2.

The high-density intermediate layer X is located between the upper elastic layer Y1 and the lower elastic layer Y2, and located at the center of the mattress 1 in the thickness direction thereof. The high-density intermediate layer X serves as a stress distribution layer which distributes locally applied load in the direction of an interface between the cushion bodies 2 and 3 by its own downwardly curvature.

The high-density intermediate layer X has the general form of a "flat layer". The flat layer does not mean a layer which is completely irregularity-free, but means a layer which is, unlike the individual three-dimensional filaments constituting the high-density intermediate layer X, just free of appreciable undulations such as ripples or curves. However, the high-density intermediate layer X in flat-layer form has only a limited extent of undulations, and the undulatory irregularities are so small that the high-density intermediate layer X appears shaped in a flat layer when viewed in section.

The following describes the configuration of each of the cushion bodies 2 and 3 constituting the bed mattress 1. As shown in FIG. 1A, the upper first cushion body 2 comprises a relatively thick low-density elastic layer 2B located at the center thereof in the thickness direction of the mattress, and an upper high-density surface layer 2A and a lower high-density surface layer 2C formed at the opposite ends, respectively, of the low-density elastic layer 2B in the thickness direction thereof (a vertical direction in the drawing).

The low-density elastic layer 2B serves mainly to support user's body tenderly by distributing the body weight (body pressure) while undergoing deformation so as to conform to the body shape. The low-density elastic layer 2B is made relatively thick from relatively low-density three-dimensional filaments bearing many voids.

Figure 2:
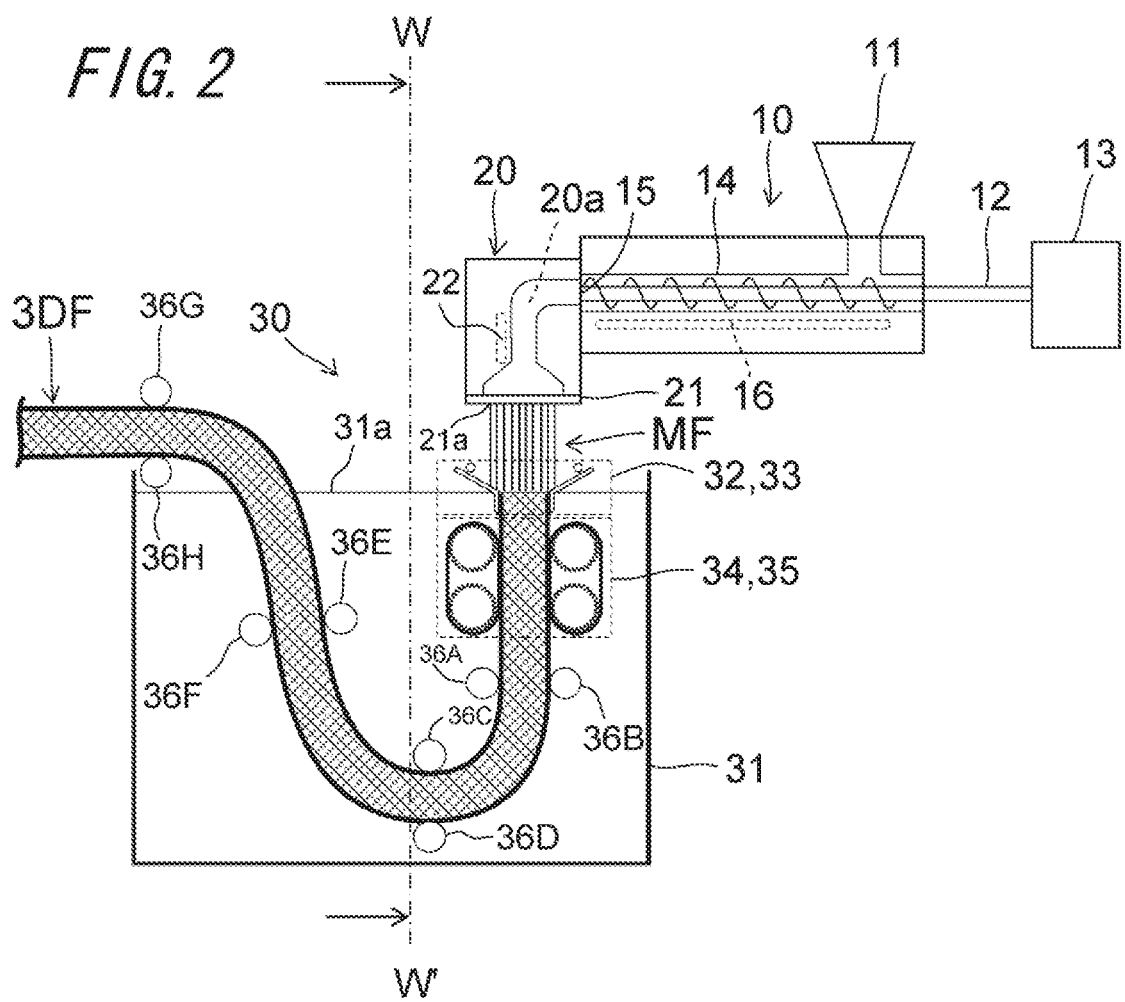
FIG. 2 is a schematic view showing the whole construction of a three-dimensional filaments-linked structure manufacturing apparatus.
Figure 3:
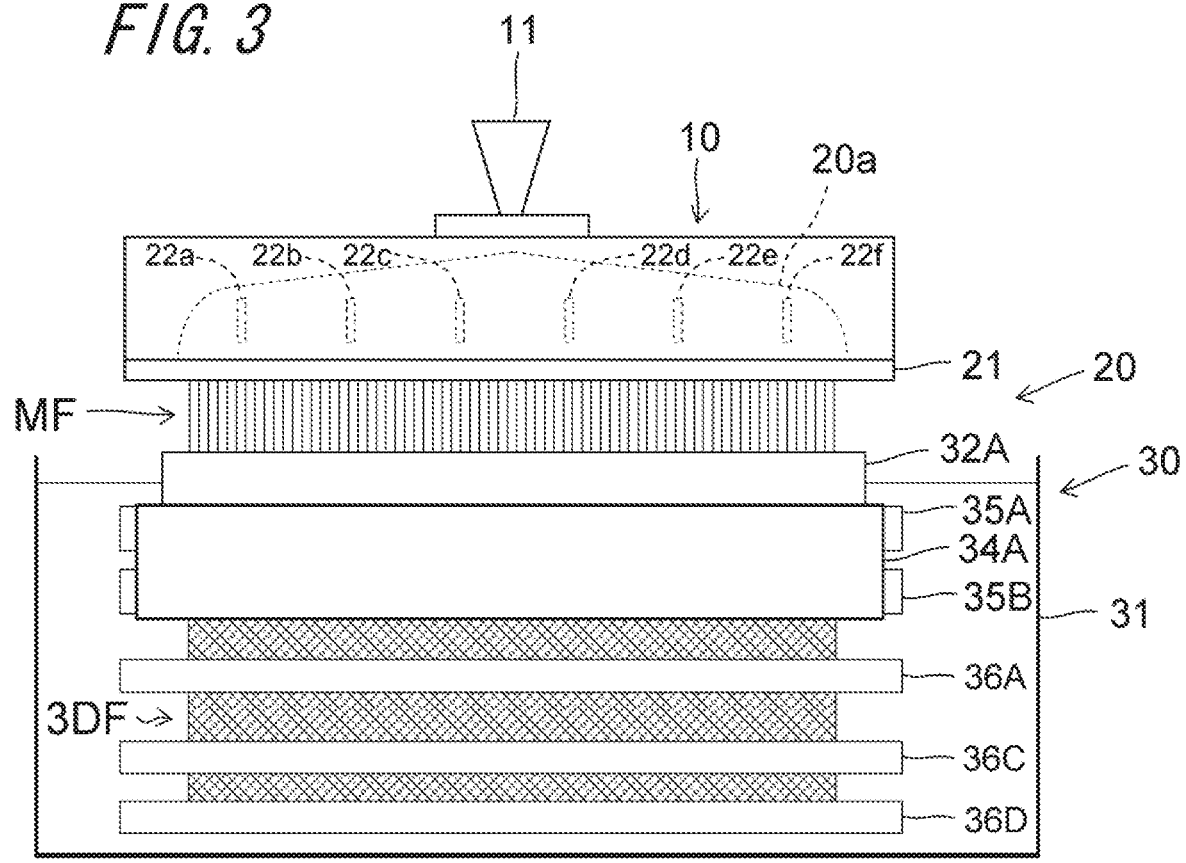
FIG. 3 is an end view taken along the line W-W' of FIG. 2.
Figure 4:
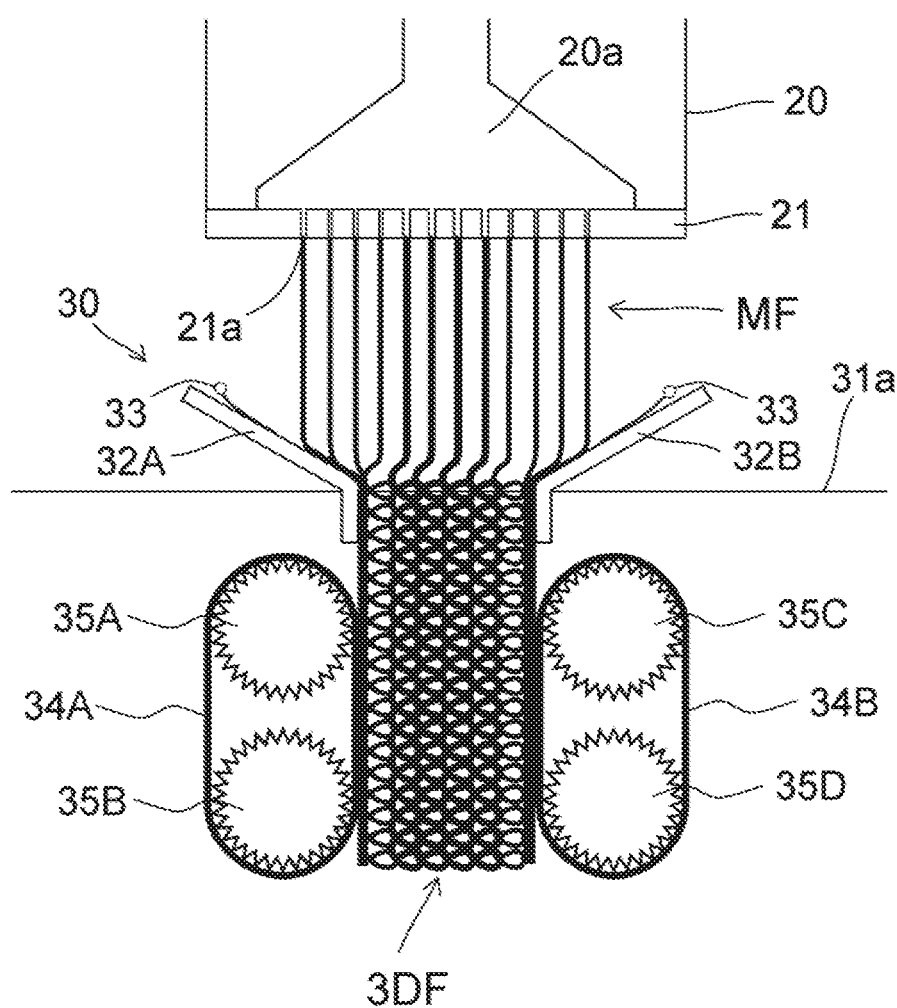
FIG. 4 is an enlarged view for explaining the design of the main components of the three-dimensional filaments-linked structure manufacturing apparatus.

Moreover, the high-density surface layers 2A and 2C, each located at corresponding one of the thickness-wise ends, are high-density flat surface layers that are formed (laminated) on the opposite sides, respectively, of the low-density elastic layer 2B in the thickness direction thereof by the following manufacturing method (refer to FIGS. 2 to 4). With use of a plurality of filaments stacked in the thickness direction, the high-density surface layers 2A and 2C are formed in higher density than the low-density elastic layer 2B.

The cushion body so constructed is manufactured by a three-dimensional filaments-linked structure manufacturing apparatus as shown in FIGS. 2 to 4.

As shown in FIG. 2, the three-dimensional filaments-linked structure manufacturing apparatus comprises: melted resin supply means (extruder 10); a melted filament-forming section (die) 20 which discharges melted filaments (denoted by MF); a three-dimensional filaments-linked structure-forming section 30 including a conveyance path for a three-dimensional filaments-linked structure (denoted by 3DF) which conveyance path is placed within a water tank 31; control means (not shown) such as a computer which centrally controls the performance (finish) of the three-dimensional filaments-linked structure by comprehensively controlling the above-described constituent components; etc.

The melted resin supply section (extruder 10) comprises: a hopper 11 (material introducing portion); a screw 12; a screw motor 13; a cylinder 14; a material discharge portion 15; and a screw heater 16. A thermoplastic resin is fed into the extruder 10 via the hopper 11, melts within the cylinder 14, and is discharged in the form of melted resin from the material discharge portion 15 toward the melted filament-forming section (die 20).

The die 20 comprises a mouthpiece plate 21 formed with a plurality of nozzles (discharge holes 21*a*), and a die heater 22 (22*a* to 22*f* in FIG. 3). The melted resin discharged from the material discharge portion 15 of the extruder 10 is fed into a die guide channel 20*a*, is directed in a vertical downward direction, and is discharged in the form of melted filaments MF from a plurality of the discharge holes 21*a*. As exemplified in FIG. 3, the discharge holes 21*a* of the mouthpiece plate 21 are aligned in a row in the direction of width of the product (three-dimensional filaments-linked structure). As shown in FIGS. 2 and 4, a plurality of rows of the discharge holes 21*a* are arranged in the thickness direction of the product.

As shown in FIG. 4, the three-dimensional filaments-linked structure-forming section 30 comprises a water tank 31 containing a coolant (water surface 31*a*), and endless conveyors 34A and 34B which provide cooling for the three-dimensional filaments-linked structure 3DF, which is obtained by linking the melted filaments MF together into a three-dimensional net-like form, while maintaining its three-dimensional configuration and thickness.

There is provided a receiving plate 32 (slanted guide plates 32A and 32B), located immediately below the mouthpiece plate 21 (a plurality of discharge holes 21*a*) and yet located above the region across the endless conveyors 34A and 34B, for aiding the retention of the melted filaments MF. Out of the melted filaments MF discharged downwardly from the die 20 located above the receiving plate, now dropping in a vertical downward direction under their own weights (under the force of gravity), a plurality of outer filaments in the thickness direction of the three-dimensional filaments-linked structure 3DF, or, in this example, at least a few or more outer filaments, are received by the upper surface of each of the guide plates 32A and 32B for flowing movement in a central direction. This process forms the earlier described high-density surface layers 2A and 2C each located at corresponding one of the thickness-wise ends.

Centrally located filaments which are not received on the pair of slanted guide plates 32A and 32B, being lower in specific gravity than water, are floated and maintained in suspension on the water surface 31*a* within the water tank 31, whereon successively discharged filaments pile up on top of each other in loop form. In this loop-like pileup, the melted filaments MF intertwine with each other in three-dimensional configuration, expressed differently, cross each other at random fashion. This process forms the earlier described low-density elastic layer 2B comprising filaments bearing large voids.

Reference numeral 33 in the drawing represents a conduit (water-sprinkling pipe) for forming a water film on each of the guide plates 32A and 32B (the slanted upper surface). The melted filaments MF carried (accumulated) on the water film formed slide down the slant of each of the guide plates 32A and 32B (water film) in an inward direction, and the frontward filaments and the rearward filaments in the thickness direction of the product merge with each other in the region (spacing) between the two guide plates 32A and 32B. This process forms the high-density surface layers 2A and 2C having high filament density.

Moreover, to achieve greater filament density as described above, in this embodiment, at least two or more filaments, or preferably three or more filaments are stacked in the thickness direction for a substantial increase in the filament density of the end-side high-density surface layers 2A and 2C. Note that the number of filaments to be stacked in the thickness direction needs to be adjusted to an extent that the surface of the mattress core material does not feel hard.

Also, the centrally located filaments which are not carried on the pair of slanted guide plates 32A and 32B are each formed (discharged) so as to have a relatively large diameter, with a consequent improvement in the modulus of compressive elasticity of the low-density elastic layer 2B in the thickness direction thereof.

It is preferable that the proportion of filaments in the surface layer of the cushion body, or equivalently, in this embodiment, for example, the proportion of filaments in each of the high-density surface layers 2A and 2C (the percentage of the area of the filament part, excluding voids, per unit area) is greater than or equal to 15%, but less than or equal to 50%. The filament proportion of less than 15% hinders the action of each cushion body in distributing stress in the interfacial direction, which results in the hitting-a-floor feeling due to local depression (formation of a deep recess). On the other hand, the filament proportion exceeding 50% leads to exertion of too high a repulsion force by the high-density surface layer, which results in user discomfort of sleeping on a mattress which is as hard as a board.

The three-dimensional filaments-linked structure 3DF, being constructed of a stack of the low-density elastic layer 2B and the high-density surface layers 2A and 2C, each unitarily fusion-linked to or intertwined with corresponding one of the ends of the low-density elastic layer 2B in the thickness direction, is conveyed while being held between the endless conveyors 34A and 34B, and is discharged to enter the water in the water tank 31 bottom first. Then, as shown in FIG. 2, the structure is completely cooled down during the passage through the conveyance path defined by conveying rollers 36A to 36F within the water tank 31, and is eventually taken out of the water tank 31 via conveying roller 36G and 36H which exerts driving force.

The endless conveyor 34A, which includes a driving roller 35A and a driven roller 35B, is rotatably driven by a conveyance motor, not shown. Likewise, the endless conveyor 34B, which includes a driving roller 35C and a driven roller 35D, is rotatably driven by a conveyance motor, not shown. To impart the "three-dimensional intertwining configuration" to the melted filaments MF, a speed of turning motion (synchronous rate) of the endless conveyors 34A and 34B is commonly adjusted to a level which is as low as about 5% to 20% of a speed of fall of the melted filament MF.

The above-described manufacturing method allows efficient manufacture of the mattress core material of three-layer structure consisting of the centrally located low-density elastic layer 2B and the high-density surface layers 2A and 2C, each unitarily fusion-linked to corresponding one of the ends of the low-density elastic layer 2B in the thickness direction (the first cushion body 2 having a total thickness of about 20 to 150 mm). The second cushion body 3 having a different thickness (total thickness) (a mattress base having a total thickness of about 150 to 250 mm) can be produced in a like manner.

As the resin material for forming each cushion body (the three-dimensional filaments-linked structure), it is possible to use thermoplastic resins, including polyolefin resins such as polyethylene and polypropylene, polyester resins, polyamide resins, polyvinyl chloride resins, and polystyrene resins. In addition, it is possible to use elastic materials, e.g., thermoplastic elastomers, including polyethylene elastomers, polypropylene elastomers, polystyrene elastomers, vinyl chloride elastomers, olefin elastomers, urethane elastomers, polyester elastomers, nitrile elastomers, polyamide elastomers, and fluorine elastomers. A polyethylene elastomer or polyester elastomer, in particular, is preferred for use on account of its softness at room temperature and high elasticity.

The performance capabilities of the cushion body (the mattress core material) in itself are determined by the following measurement process. That is, measurements have been made of the apparent density, compressive deformation rate, and elongation deformation amount of the cushion body as indices of its own performance.

In determining the apparent density (bulk density), the mass w (kg), the width v (m), the depth d (m), and the height h (m) of a rectangular prism-shaped sample cut from the cushion body have been measured, and, a value G obtained by calculation using the following equation (1) is defined as the apparent density (kg/m$^3$).

$$G=w/(v \times d \times h) \qquad (1)$$

Note that a mean apparent density is derived from the result of measurement on each sample cut from the cushion body in a direction parallel to the thickness direction (vertical direction) thereof so as to include both the low-density elastic layer and the high-density surface layers.

In this embodiment, the apparent density of the high-density surface layer (2A, 2C, 3A, 3C) part of the cushion body (2, 3) falls in the range of 60 kg/m$^3$ to 300 kg/m$^3$, and, the apparent density of the low-density elastic layer (2B, 3B) part of the same cushion body (2, 3) falls in the range of 30 kg/m$^3$ to 155 kg/m$^3$.

The apparent density of the low-density elastic layer (2B, 3B) part of the cushion body (2, 3) is preferably adjusted within the range of 35 kg/m$^3$ to 90 kg/m$^3$, or more preferably adjusted within the range of 40 kg/m$^3$ to 70 kg/m$^3$. The low-density elastic layer's apparent density of less than 30 kg/m$^3$ leads to lack of repulsion force that may hinder the user from rolling over comfortably in his/her sleep. On the other hand, the low-density elastic layer's apparent density exceeding 155 kg/m$^3$ leads to an increase in weight, poor breathability, and deterioration in water washability and water dissipation during a cleaning process, in the cushion body.

Moreover, in the cushion body as a whole, the mean apparent density of the upper first cushion body 2, as well as the lower second cushion body 3, constituting the mattress core material 1 falls in the range of 35 kg/m$^3$ to 150 kg/m$^3$.

The rate of compressive deformation of each of the cushion bodies 2 and 3 in this embodiment is determined by measurement using the following testing method (A). The rate of compressive deformation of the high-density surface layer (2A, 2C, 3A, 3C) part of the cushion body (2, 3) is greater than 0% but less than 25%, and, the rate of compressive deformation of the low-density elastic layer (2B, 3B) part of the cushion body (2, 3) is greater than or equal to 5%, but less than or equal to 80%.

(A) Compressive Deformation Rate

Figure 5A:
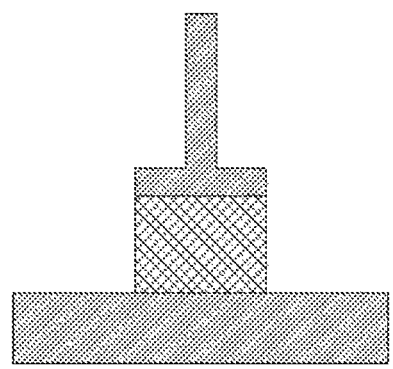
FIG. 5A and FIG. 5B are explanatory diagrams of measurement of a rate of compressive deformation and repulsion force under compression at planar load.
Figure 5B:
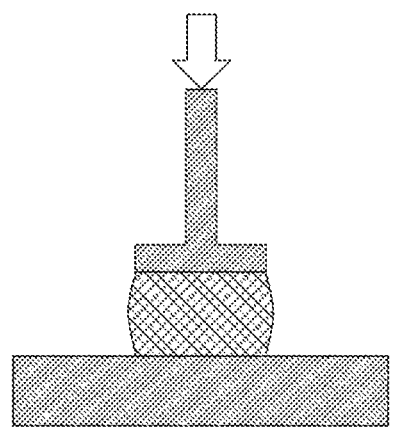

A 2 mm-thick, horizontally sliced piece of the high-density surface layer is cut into a square which is 100 mm on a side to provide a sample. The measured thickness of the sample in uncompressed condition is defined as a thickness L1 (mm). Then, as shown in FIG. 5A, a loading element having a 100 mm square shaped pressurizing plate at a front end thereof is placed on the upper surface of the sample, with the pressurizing plate snugly aligned with the upper surface, and, a load of 200 N is applied to the loading element to determine a thickness L2 (mm) of the sample at the load (refer to FIG. 5B). The percentage of variation in thickness under the planar load [{(L1−L2)/(L1)}×100] is defined as the rate of compressive deformation of the high-density surface layer part (%).

Likewise, a 2 mm-thick, horizontally sliced piece of the low-density elastic layer part, remaining after the removal of the high-density surface layer part, is cut into a square which is 100 mm on a side to provide a sample. The measured thickness of the sample in uncompressed condition is defined as a thickness L1 (mm). Then, a loading element having a 100 mm square shaped pressurizing plate at a front end thereof is placed on the upper surface of the sample, with the pressurizing plate snugly aligned with the upper surface, and, a load of 200 N is applied to the loading element to determine a thickness L2 (mm) of the sample at the load. The percentage of variation in thickness under the planar load [ {(L1−L2)/(L1)}×100] is defined as the rate of compressive deformation of the low-density elastic layer part (%).

The rate of compressive deformation of the high-density surface layer part (2A, 2C, 3A, 3C) of the cushion body (2, 3) is preferably greater than 0% but less than 25%, or more preferably greater than 0% but less than 10%. The compressive deformation rate of greater than or equal to 25% may lead to the tearing out of fusion-linked points or connected points in the three-dimensional filaments-linked structure during deformation (stretching of layers).

The rate of compressive deformation of the low-density elastic layer (2B, 3B) part of the cushion body (2, 3) is greater than or equal to 5% but less than or equal to 80%, or preferably greater than or equal to 10% but less than or equal to 80%, or more preferably greater than or equal to 20% but less than or equal to 50%. The compressive deformation rate of less than 10% causes user discomfort of sleeping on a hard mattress with poor body pressure-distributing performance. On the other hand, the compressive deformation rate exceeding 80% leads to lack of sufficient repulsion force that may hinder the user from rolling over comfortably in his/her sleep.

Moreover, in the cushion body as a whole, the mean compressive deformation rate of the upper first cushion body 2, as well as the lower second cushion body 3, constituting the mattress core material falls in the range of 5% to 80%. The mean compressive deformation rate is derived from the result of measurement on each sample cut from the cushion body in a direction parallel to the thickness direction (vertical direction) thereof so as to include both the low-density elastic layer and the high-density surface layers.

The elongation deformation amount of each of the cushion bodies 2 and 3 in this embodiment is determined by measurement using the following testing method (B). The elongation deformation amount of the high-density surface layer (2A, 2C, 3A, 3C) part of the cushion body (2, 3) is greater than or equal to 10 mm, but less than or equal to 150 mm.

(B) Elongation Deformation Amount

Figure 6A:
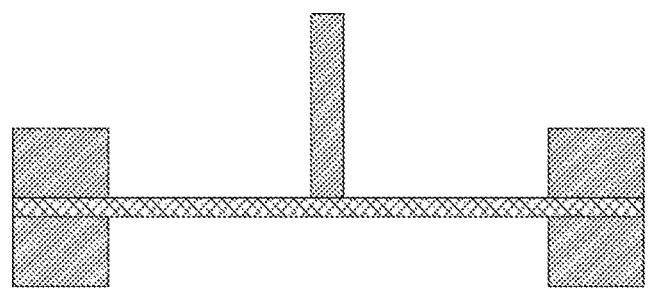
FIG. 6A and FIG. 6B are explanatory diagrams of measurement of a sag amount and an elongation deformation amount.
Figure 6B:
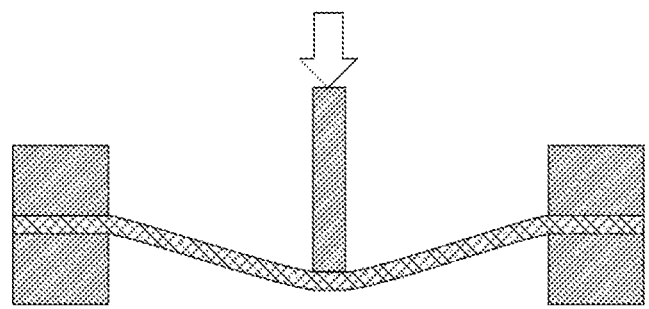

A 2 mm-thick, horizontally sliced piece of the high-density surface layer is cut into a 400 mm diameter circle to provide a sample. The sample is retained between a pair of frame-like plates each having a 300 mm diameter circular opening, so that part of the sample is left exposed in the form of a 300 mm diameter circle (2 mm in thickness) inside the frame, to prepare a test piece. Then, as shown in FIG. 6A, a loading element having a 20 mm diameter circular pressurizing plate at a front end thereof is brought into contact with the center of the upper surface of the circular sample inside the frame, and, a load of 100 N is applied to the loading element to deform the central area of the circular sample into a concave recess (an inverted cone). In this condition, a sag amount L3 (mm) of the central area of the circular sample from the level of the frame is measured from the side of the test piece (refer to FIG. 6B). The sag amount L3 is defined as the elongation deformation amount of the high-density surface layer part (mm).

The elongation deformation amount of the high-density surface layer (2A, 2C, 3A, 3C) part of the cushion body (2, 3) is preferably greater than or equal to 10 mm but less than or equal to 150 mm, or more preferably greater than or equal to 50 mm but less than or equal to 100 mm. The elongation deformation amount of less than 10 mm hampers formation of a deep recess at locally applied load, with the consequent impairment of cushion effects. On the other hand, the elongation deformation amount exceeding 150 mm may lead to the tearing out of fusion-linked points or connected points in the three-dimensional filaments-linked structure during deformation.

Next, in the mattress core material 1 as a whole, namely the two vertically stacked cushion bodies 2 and 3 in one-piece design as shown in FIG. 1B, measurements have been made of its repulsion force under compression at planar load and index of repulsion force at local load.

In this embodiment, the repulsion force of the mattress core material 1 under compression at planar load is determined by measurement using the following testing method (C). The repulsion force of the entire mattress core material 1 under compression at planar load is greater than or equal to 100 N, but less than or equal to 400 N.

(C) Repulsion Force Under Compression at Planar Load

Just as in the case of determining "compressive deformation rate" of the cushion body, a sample is cut from the mattress core material in a direction parallel to the thickness direction thereof in the form of a rectangular prism having a 150 mm square shaped upper surface (top face). Then, as shown in FIG. 5A, a loading element having a 150 mm square shaped pressurizing plate at a front end thereof is placed on the upper surface of the sample, with the pressurizing plate snugly aligned with the upper surface, and, a load of 5 N is applied to the loading element to determine an initial thickness L4 (mm) of the sample at the load of 5 N (refer to FIG. 5B). Subsequently, the load applied to the loading element is increased at a rate of 20 N per second to compress the sample in the thickness direction thereof. Upon detection of a 15 mm decrease of the thickness (mm) of the compressed sample from the initial thickness L4 (when the thickness reaching a [L4−15] level), the value of a load L5 (N) applied to the loading element is recorded. This load value L5 is defined as the repulsion force under compression at planar load (N).

The repulsion force of the entire mattress core material 1 under compression at planar load is preferably greater than or equal to 100 N but less than or equal to 400 N (per 0.0225 $m^2$), or more preferably greater than or equal to 150 N but less than or equal to 300 N. The repulsion force under compression at planar load of less than 100 N leads to lack of sufficient repulsion force, which causes user's body to sink down on the mattress and thus hinders the user from rolling over comfortably in his/her sleep. On the other hand, the repulsion force under compression at planar load of greater than 400 N leads to poor body pressure-distributing performance, which impairs the effect of comfortable sleeping on a soft mattress.

In this embodiment, the index of repulsion force of the mattress core material 1 at local load is determined by measurement using the following testing method (D). The index of repulsion force of the entire mattress core material 1 at local load is greater than or equal to 2.5, but less than or equal to 6.5.

(D) Index of Repulsion Force at Local Load

Figure 7A:
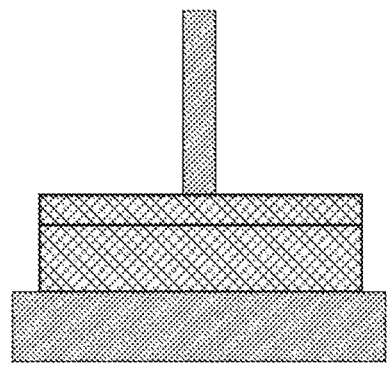
FIG. 7A, FIG. 7B, and FIG. 7C are explanatory diagrams of measurement of an index of repulsion force at local load.
Figure 7B:
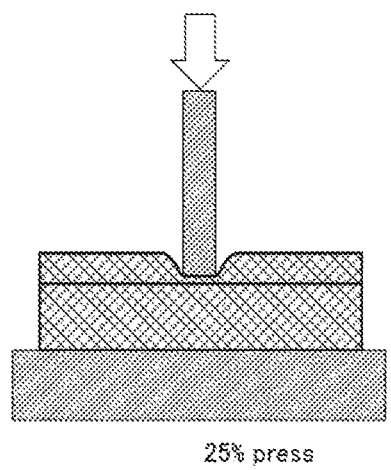
Figure 7C:
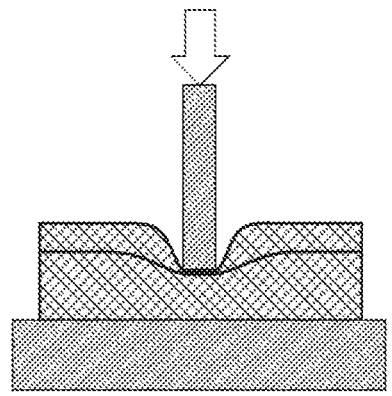

Just as in the case of determining the repulsion force under compression at planar load, a sample is cut from the mattress core material in a direction parallel to the thickness direction thereof in the form of a rectangular prism having a 300 mm square shaped upper surface (top face). Then, as shown in FIG. 7A, a cylindrical loading element having a 50 mm diameter front end is brought into contact with the center of the upper surface of the sample, and, a load of 5 N is applied to the loading element to determine an initial thickness L6 (mm) of the sample. Subsequently, the load applied to the loading element is increased at a rate of 20 N per second to compress the sample in the thickness direction thereof. As shown in FIG. 7B, upon detection of a 25% decrease of the thickness (mm) of the compressed sample from the initial thickness L6 (when the thickness reaching a [L6×0.75] level), the value of a load L7 applied to the loading element is recorded as a repulsion force under 25% compression at local load (N), and also, as shown in FIG. 7C, upon further detection of a 50% decrease of the thickness (mm) of the compressed sample from the initial thickness L6 (when the thickness reaching a [L6×0.5] level), the value of a load L8 (N) applied to the loading element is recorded as a repulsion force under 50% compression at local load (N). The ratio of the repulsion force under 50% compression at local load L8 (N) to the repulsion force under 25% compression at local load L7 (N) [L8/L7] is defined as the index of repulsion force at local load.

The index of repulsion force of the entire mattress core material 1 at local load is preferably greater than or equal to 2.5 but less than or equal to 6.5, or more preferably greater than or equal to 3.0 but less than or equal to 5.0. The index of repulsion force at local load of less than 2.5 may cause the hitting-a-floor feeling under a local deep recess-forming load. On the other hand, the index of repulsion force at local load of greater than 6.5 makes the mattress too hard, with the consequent impairment of cushion effects.

As shown in FIG. 1B, the high-density intermediate layer X of the mattress core material 1 according to the first embodiment, which comprises the high-density lower surface layer 2C of the first cushion body 2 and the high-density upper surface layer 3A of the second cushion body 3 combined in one-piece design, is a 2 to 30 mm-thick layer which is deformable in the direction of application of pressure (load). This layer exerts a repulsion force while undergoing compressive deformation when subjected to planarly applied pressure, and serves to distribute the locally applied load in the direction of the interface between the cushion bodies 2 and 3 by its own downward curvature.

The thickness of the mattress core material 1 comprising the cushion bodies 2 and 3 as a whole (total thickness) is preferably greater than or equal to 150 mm but less than or equal to 400 mm, or more preferably greater than or equal to 180 mm but less than or equal to 300 mm. The total mattress thickness of less than 150 mm creates a need to design the mattress for a higher rate of variation in repulsion force to reduce the hitting-a-floor feeling, which leads to poor body pressure-distributing performance. On the other hand, the total mattress thickness exceeding 400 mm creates a tendency toward the difficulty of transportation and installation operation. It is preferable that the ratio of the thickness of the upper first cushion body 2 to the total thickness of the mattress core material 1 is greater than or equal to 14%, but less than or equal to 32%.

Moreover, in the mattress core material 1 having the above-described thickness (total thickness), the interface between (the juncture of) the cushion bodies 2 and 3 is preferably located in a position spaced downwardly from the upper surface where the user sleeps by a distance of 20 to 100 mm (lower part of the mattress). That is, the thickness of the upper first cushion body 2 is adjusted to about 20 to 100 mm.

The first cushion body 2's thickness of less than 20 mm causes the user to incur too high a repulsion force exerted by the mattress at his/her shoulder during lying on his/her side in sleep, which leads to poor body pressure-distributing performance. On the other hand, the first cushion body 2's thickness exceeding 100 mm causes the high-density intermediate layer X to be too far apart from the surface (upper surface) of the mattress core material 1. In this case, the upper high-density surface layer 2A of the first cushion body 2 at the upper surface is stretched greatly when subjected to a local deep recess-forming load, which may result in the tearing out of the fusion-linked three-dimensional filaments constituting the layer 2A.

A way to increase the index of repulsion force of the entire mattress core material at local load is to impart a relatively large thickness to the high-density intermediate layer X located in an intermediate position of the mattress, as compared to other high-density surface layers. That is, by adjusting the index of repulsion force of the high-density intermediate layer X at local load to be smaller than the index of the repulsion force at local load of the upper high-density surface layer 2A at the outermost part (upper surface) of the mattress core material (for less stretchability), it is possible to achieve an improvement in resistance to formation of a deep depression without impairment of the body pressure-distributing performance.

In the thereby constructed mattress core material according to the first embodiment, as shown in FIG. 8, the high-density intermediate layer X located intermediate the cushion bodies 2 and 3 serves as a stress distribution layer that distributes locally applied load in the direction of the interface between the cushion bodies 2 and 3 by its own downward curvature. Thus, in the mattress core material according to this embodiment, even if a sharp-pointed deep depression, such as an inverted cone-like depression, appears due to the pressing action of user's knee or elbow, it never occurs that the front end of this deep depression is brought into contact with the top board, etc., of a bed, in consequence whereof there results little hitting-a-floor feeling. Moreover, the mattress core material 1 according to this embodiment is not designed for unduly high hardness and elasticity, and the advantages of comfortable sleeping on a soft mattress and adequate body pressure distribution can be maintained accordingly. Thus, the mattress core material 1 achieves both comfortable sleeping on a soft mattress and minimization of the hitting-a-floor feeling.

Although the first embodiment exemplifies the mattress core material 1 comprising two vertically stacked cushion bodies (2 and 3), the number and arrangement of the cushion bodies are not so limited, and, the mattress core material may include three or more layers. For example, as practiced in the second embodiment shown in FIG. 9B, the mattress core material may be designed in a three-layer structure.

Figure 9A:
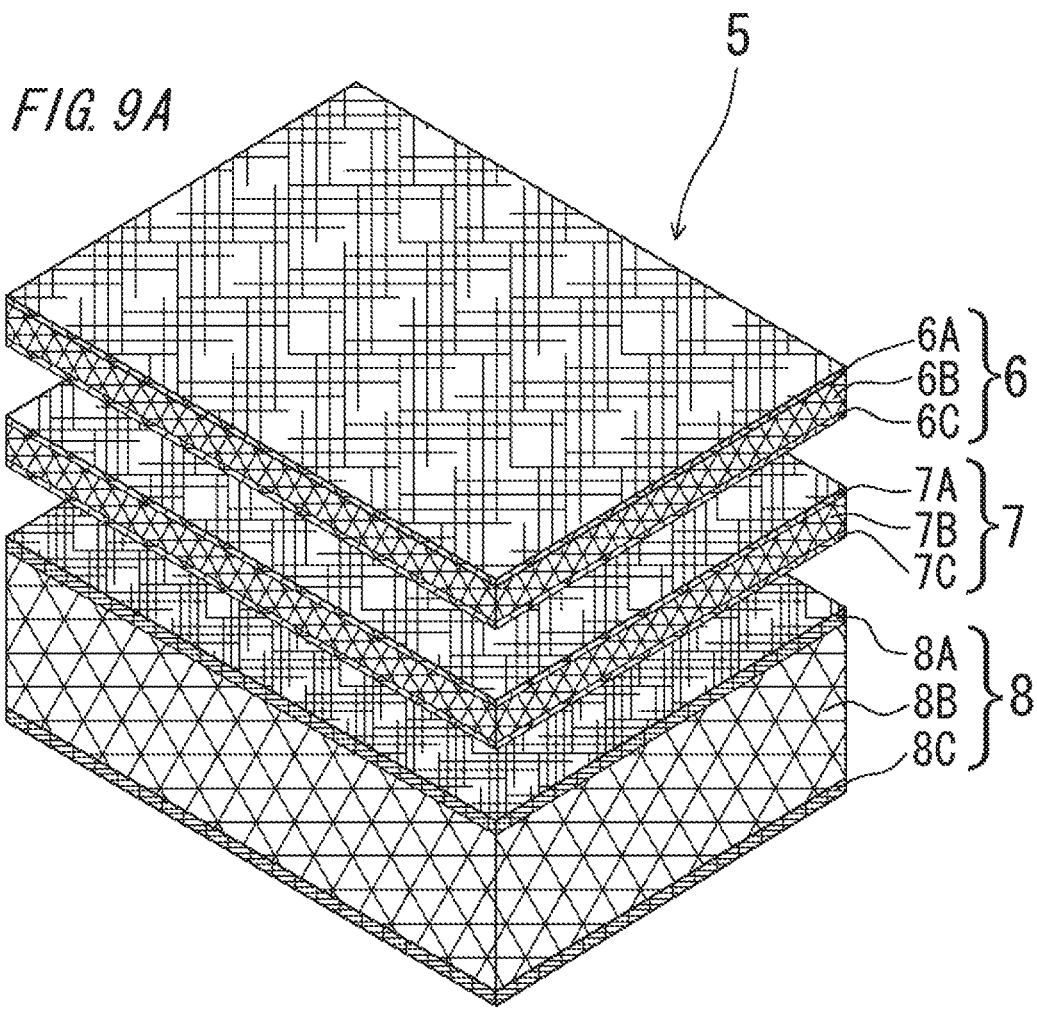
FIG. 9A and FIG. 9B are an exploded perspective view and an end view, respectively, that show the design of a mattress core material in accordance with the second embodiment of the invention.
Figure 9B:
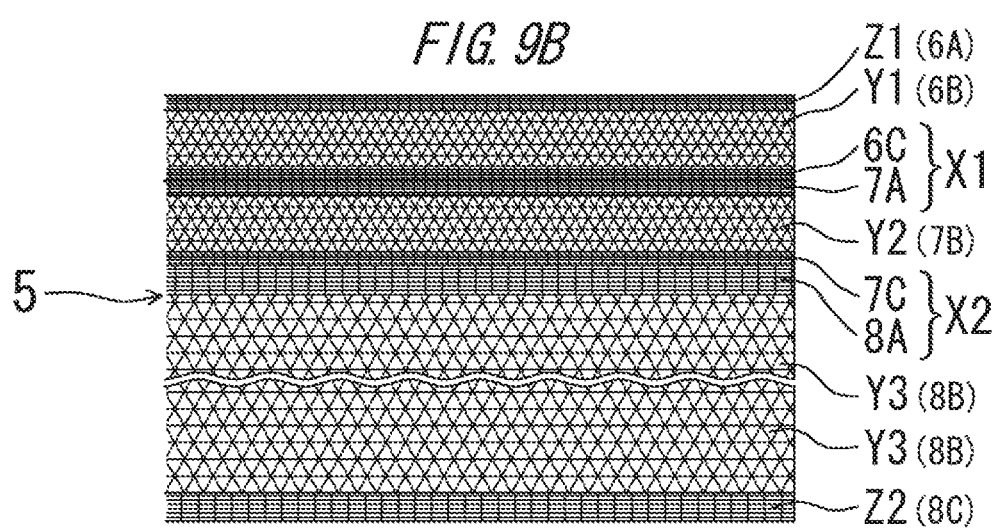

A mattress core material 5 as shown in FIG. 9B in accordance with the second embodiment of the invention has a three-layer structure consisting of a first cushion body 6, a second cushion body 7, and a third cushion body 8 which are vertically stacked as shown in FIG. 9A, each comprising a low-density elastic layer located in a thickness-wise intermediate position, and a high-density upper surface layer and a high-density lower surface layer disposed at the opposite ends, respectively, of the low-density elastic layer. That is, the mattress core material 5 comprises, in top-to-bottom order, the cushion body 6 (mattress pad having a total thickness of about 10 to 150 mm); the cushion body 7 (intermediate mattress having a total thickness of about 10 to 150 mm); and the cushion body 8 (mattress base having a total thickness of about 150 to 250 mm).

Thus, the mattress core material 5 has two high-density intermediate layers, each formed between the corresponding cushion bodies (at an interface between them). That is, in this case, the mattress core material 5 according to this embodiment, in the form of a finished mattress-core-material product constructed of the integrally stacked three cushion bodies 6, 7, and 8 as shown in FIG. 9B, comprises, in order from the surface of the mattress that supports a sleeping user (in top-to-bottom order in the drawing), a body-pressure support surface layer (a high-density upper surface layer) Z1, an upper elastic layer (a low-density elastic layer) Y1, a first high-density intermediate layer X1 (a combination of a high-density lower surface layer 6C of the first cushion body 6 and a high-density upper surface layer 7A of the second cushion body 7), an intermediate elastic layer (a low-density elastic layer) Y2, a second high-density intermediate layer X2 (a combination of a high-density lower surface layer 7C of the second cushion body 7 and a high-density upper surface layer 8A of the third cushion body 8), a lower elastic layer (a low-density elastic layer) Y3, and a back-side support layer (a high-density lower surface layer) Z2.

Just as is the case with the first embodiment, each of the high-density intermediate layers X1 and X2 serves as a stress distribution layer that distributes locally applied load in the direction of the interface among the cushion bodies 6, 7, and 8 by its own downward curvature.

In the mattress core material 5 of three-layer structure, the performance capabilities of each mattress core material-constituting cushion body in itself are equivalent to those of the cushion body (2, 3) of the first embodiment. That is, the apparent density of the high-density surface layer (6A, 6C, 7A, 7C, 8A, 8C) part of the cushion body (6, 7, 8) falls in the range of 60 kg/m$^3$ to 300 kg/m$^3$, and, the apparent density of the low-density elastic layer (6B, 7B, 8B) part of the same cushion body falls in the range of 30 kg/m$^3$ to 155 kg/m$^3$. It is preferable that the apparent density of the low-density elastic layer (6B, 7B, 8B) part of the cushion body (6, 7, 8) falls in the range of 40 kg/m$^3$ to 70 kg/m$^3$.

The mean apparent density of each of the upper first cushion body 6, the intermediate second cushion body 7, and the lower third cushion body 8 falls in the range of 35 kg/m$^3$ to 150 kg/m$^3$.

Moreover, the rate of compressive deformation of each of the cushion bodies 6, 7, and 8 has been determined by measurement using the earlier described testing method (A). The rate of compressive deformation of the high-density surface layer (6A, 6C, 7A, 7C, 8A, 8C) part is greater than 0% but less than 25%, and, the rate of compressive deformation of the low-density elastic layer (6B, 7B, 8B) part is greater than or equal to 5%, but less than or equal to 80%.

Moreover, the elongation deformation amount of each of the cushion bodies 6, 7, and 8 has been determined by measurement using the earlier described testing method (B). The elongation deformation amount of the high-density surface layer (6A, 6C, 7A, 7C, 8A, 8C) part is greater than or equal to 10 mm, but less than or equal to 150 mm.

The repulsion force of the entire mattress core material 5 in the form of an integral stack of the three cushion bodies 6, 7, and 8 as shown in FIG. 9B under compression at planar load, which has been determined by measurement using the earlier described testing method (C), is greater than or equal to 100 N, but less than or equal to 400 N. Moreover, the index of repulsion force of the entire mattress core material 5 at local load, which has been determined by measurement using the earlier described testing method (D), is greater than or equal to 2.5, but less than or equal to 6.5. The measurement results thus far described are similar to those as to the mattress core material 1 of the first embodiment.

Thus, just as is the case with the mattress core material 1, in the mattress core material 5 according to the second embodiment, each of the high-density intermediate layers X1 and X2, each located intermediate the corresponding cushion bodies (6, 7, 8), serves as a stress distribution layer that distributes locally applied load in the direction of the interface among the cushion bodies 6, 7, and 8 by its own downward curvature. Consequently, also in the mattress core material 5 according to this embodiment, even if a sharp-pointed deep depression, such as an inverted cone-like depression, appears due to the pressing action of user's knee or elbow, it never occurs that the front end of this deep depression is brought into contact with the top board, etc., of a bed. This makes it possible to prevent occurrence of the hitting-a-floor feeling.

Figure 10A:
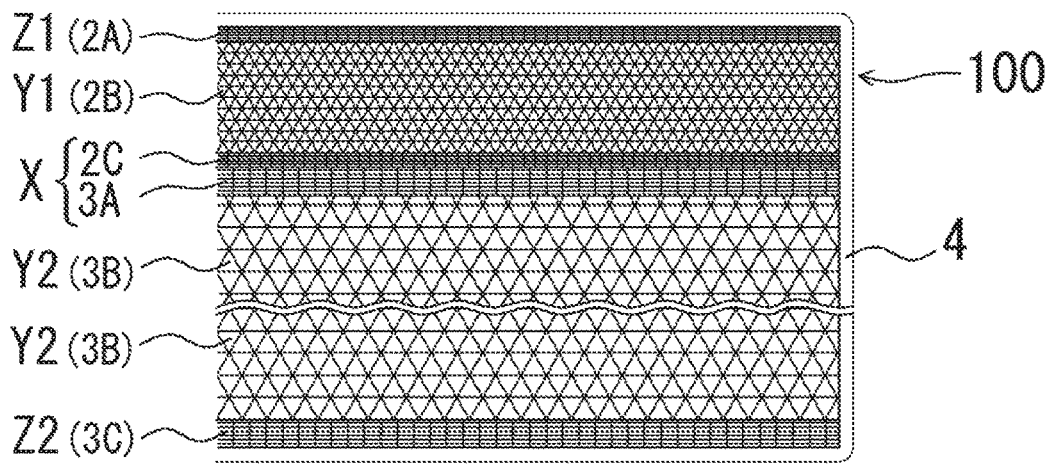
FIG. 10A is a view showing a bed mattress in which the mattress core material according to the first embodiment is covered with a cover.
Figure 10B:
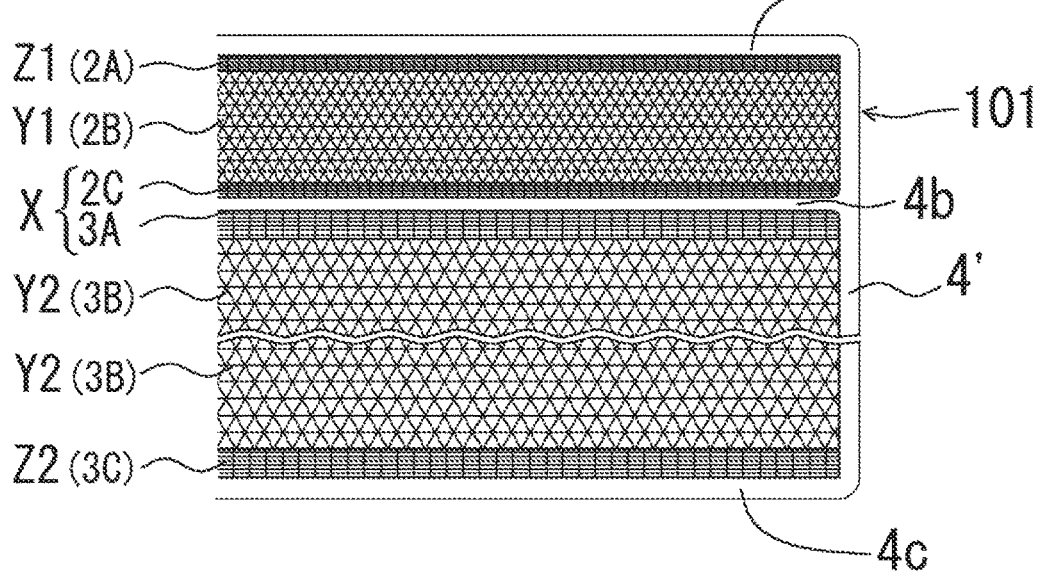
FIG. 10B is a view showing a bed mattress in which the mattress core material is covered with a cover of different type.

The following describes the mattress core material covered with a mattress cover (bed mattress). FIG. 10A and FIG. 10B are schematic sectional views showing a bed mattress 100 covered with a cover 4 and a bed mattress 101 covered with a cover 4', respectively.

The bed mattress 100 is constructed by laying the cushion body 2 (mattress pad having a total thickness of about 20 to 150 mm) on the lower cushion body 3 (mattress base having a total thickness of about 150 to 250 mm), each obtained by the earlier described production method, and thereafter placing the stack in the mattress cover 4 so that the cushion body 2 and the cushion body 3 are held securely to prevent horizontal misalignment.

As shown in FIG. 10B, the mattress cover that stores therein the cushion bodies may be shaped like a bag having a partition (intermediate cover 4b) located so as to separate the lower cushion body 3 and the upper cushion body 2 (two-part split bag). In such a construction, the cushion bodies 2 and 3 are separately received in an upper housing space defined by a surface-side cover 4a and the intermediate cover 4b, and a lower housing space defined by the intermediate cover 4b and a back-side cover 4c, respectively. This permits easy replacement of any one of the cushion bodies 2 and 3. Moreover, the ease of separate removal of each cushion body facilitates cleaning (water washing) of the cushion bodies on an individual basis.

While the mattress cover (4, 4') may be formed of any suitable cloth which holds the cushion bodies securely to prevent their misalignment without limitation, it is desirable to use fabric that is machine washable and can be readily dried while hanging on a laundry pole. Examples of preferred cloth include pile-woven fabric, jacquard knitted fabric, double raschel fabric, and quilting fabric which are made by weaving polyester yarns, nylon yarns, acrylic yarns, etc.

For example, a slide fastener is provided on the side of each housing space. The insertion and withdrawal of each cushion body may be done simply by opening the slide fastener. This permits cleaning of the cushion bodies on an individual basis.

Although the cover is adopted as a specific example of securing means for holding a plurality of cushion bodies securely to prevent horizontal misalignment in this embodiment, the securing means is not limited to the cover, but may be of other known means such as a string or buckle.

Like the cover-free mattress core material (1, 5), the bed mattress 100, 101 with cover, etc. may be submitted to the same measurement of repulsion force under compression at planar load and index of repulsion force at local load.

That is, the repulsion force of the bed mattress 100, 101 under compression at planar load is determined by measurement using the following testing method (E). The repulsion force of the entire bed mattress under compression at planar load is greater than or equal to 100 N, but less than or equal to 400 N.

(E) Repulsion Force Under Compression at Planar Load

A sample is vertically cut from the mattress core material in the thickness direction thereof so as to include all of the surface-side cover 4a, the back-side cover 4c, and the intermediate cover 4b in the form of a rectangular prism having a 150 mm square shaped upper surface (top face). Then, as shown in FIG. 5A, a loading element having a 150 mm square shaped pressurizing plate at a front end thereof is placed on the upper surface of the sample, with the pressurizing plate snugly aligned with the upper surface, and, a load of 5 N is applied to the loading element to determine an initial thickness L9 (mm) of the sample (refer to FIG. 5B). Subsequently, the load applied to the loading element is increased at a rate of 20 N per second to compress the sample in the thickness direction thereof. Upon detection of a 15 mm decrease of the thickness (mm) of the compressed sample from the initial thickness L9 (when the thickness reaching a [L9−15] level), the value of a load L10

(N) applied to the loading element is recorded. This load value L10 is defined as the repulsion force under compression at planar load (N).

The repulsion force of the entire bed mattress 100, 101 under compression at planar load is preferably greater than or equal to 100 N but less than or equal to 400 N (per 0.0225 $m^2$), or more preferably greater than or equal to 150 N but less than or equal to 300 N. Just as is the case with the mattress core material alone, the repulsion force under compression at planar load of less than 100 N leads to lack of sufficient repulsion force, which causes user's body to sink down on the mattress and thus hinders the user from rolling over comfortably in his/her sleep. On the other hand, the repulsion force under compression at planar load of greater than 400 N leads to poor body pressure-distributing performance, which impairs the effect of comfortable sleeping on a soft mattress.

The index of repulsion force of the bed mattress 100, 101 at local load is determined by measurement using the following testing method (F). Just as is the case with the mattress core material alone, the index of repulsion force of the entire bed mattress at local load is greater than or equal to 2.5, but less than or equal to 6.5.

(F) Index of Repulsion Force at Local Load

A sample is vertically cut from the mattress core material in the thickness direction thereof so as to include all of the surface-side cover, the back-side cover, and the intermediate cover in the form of a rectangular prism having a 300 mm square shaped upper surface (top face). Then, as shown in FIG. 7A, a cylindrical loading element having a 50 mm diameter front end is brought into contact with the center of the upper surface of the sample, and, a load of 5 N is applied to the loading element to determine an initial thickness L11 (mm) of the sample. Subsequently, the load applied to the loading element is increased at a rate of 20 N per second to compress the sample in the thickness direction thereof. As shown in FIG. 7B, upon detection of a 25% decrease of the thickness (mm) of the compressed sample from the initial thickness L11 (when the thickness reaching a [L11×0.75] level), the value of a load L12 applied to the loading element is recorded as a repulsion force under 25% compression at local load (N), and also, as shown in FIG. 7C, upon further detection of a 50% decrease of the thickness (mm) of the compressed sample from the initial thickness L11 (when the thickness reaching a [L6×0.5] level), the value of a load L13 (N) applied to the loading element is recorded as a repulsion force under 50% compression at local load (N). The ratio of the repulsion force under 50% compression at local load L13 (N) to the repulsion force under 25% compression at local load L12 (N) [L13/L12] is defined as the index of repulsion force at local load.

The index of repulsion force of the entire bed mattress 100, 101 at local load is preferably greater than or equal to 2.5 but less than or equal to 6.5, or more preferably greater than or equal to 3.0 but less than or equal to 5.0. The index of repulsion force at local load of less than 2.5 may cause the hitting-a-floor feeling under a local deep recess-forming load. On the other hand, the index of repulsion force at local load of greater than 6.5 makes the mattress too hard, with the consequent impairment of cushion effects.

Also in the described bed mattress with cover, the high-density intermediate layer X formed intermediate the individual cushion bodies serves as a stress distribution layer that distributes locally applied load in the direction of the interface between the cushion bodies by its own downward curvature. Thus, also in the bed mattress according to this embodiment, even if a sharp-pointed deep depression, such as an inverted cone-like depression, appears due to the pressing action of user's knee or elbow, it never occurs that the front end of this deep depression is brought into contact with the top board, etc., of a bed, in consequence whereof there results little hitting-a-floor feeling (refer to the representation shown in FIG. 8).

The bed mattress 100, 101 according to this embodiment is also not designed for unduly high hardness and elasticity, and the advantages of comfortable sleeping on a soft mattress and adequate body pressure distribution can be maintained accordingly. Thus, like the mattress core material alone, the bed mattress achieves both comfortable sleeping on a soft mattress and minimization of the hitting-a-floor feeling. In addition to that, the bed mattress 100, 101 is advantageous in that the cushion bodies placed in the cover can be washed on an individual basis with ease.

EXAMPLES

Following the completion of measurements of the repulsion force under compression at planar load and index of repulsion force at local load of each mattress core material so produced, performance evaluations have been conducted to examine the correlation between the measured performance values and the attainment of both comfortable sleeping (body pressure-distributing capability) and elimination of "hitting-a-floor feeling". The following describes the test results.

Like the mattress core material 1 exemplified as the first embodiment, Examples 1 to 6 and Comparative example 1 (mattress core material samples) as listed in "Table 1" to be hereafter referred to are each constructed of two vertically stacked mattress core material portions, namely the first cushion body 2 and the second cushion body 3. The examples and comparative example differ from one another in the thickness and properties of their respective cushion bodies used in combination. Note that Example 7 exemplifies the bed mattress 101 with the cover 4' (refer to FIG. 10B), and thus this sample comprises the mattress core material of Example 4 covered with a 5 mm-thick mattress cover obtained by weaving polyester yarns into double raschel fabric. A test sample is vertically cut from each mattress core material in the thickness direction thereof so as to include all of the surface-side cover, the back-side cover, and the intermediate cover.

For purposes of performance comparison, Examples 1 to 6 and Comparative example 1 (including Reference examples 1 and 2), each in the form of a bed mattress constructed of a combination of the upper and lower cushion bodies, have the same mattress thickness set at 250 mm (Example 7 is 265 mm in total thickness due to inclusion of the cover). A difference between Example and Comparative example is in the placement of the high-density intermediate layer X. Examples are each provided with the high-density intermediate layer X, located in an intermediate region where the upper and lower cushion bodies are contiguous with each other (in an intermediate position in the vertical direction), for providing stress distribution capability to distribute such a heavy load as may cause a deep depression in a planar direction. Moreover, as listed in the lower columns in Table 1, there were additionally prepared Reference examples 1 and 2, each in the form of a conventional mattress of single-layer type (cushion body) in which a high-density layer is disposed only at each end (top side and bottom side) of an intermediate mattress part in the thickness direction thereof, and the intermediate part is composed solely of a low-density elastic layer without containing the high-density layer.

mattress core material or the mattress with cover (Example 7) in a direction parallel to the thickness direction thereof in the form of a rectangular prism having a 300 mm square

TABLE 1

|  |  | Mean apparent density (kg/m$^3$) | Elongation deformation amount of High-density (upper and lower) surface layer (mm) | Compressive deformation rate of High-density (upper and lower) surface layer (%) | Compressive deformation rate of Low-density (intermediate) elastic layer (%) | (Single layer) Thickness (mm) | Total thickness of mattress stack (mm) |
|---|---|---|---|---|---|---|---|
| Example 1 | Upper cushion body | 54 | 137 | 8 | 48 | 25 | 250 |
|  | Lower cushion body | 56 | 40 | 4 | 22 | 225 |  |
| Example 2 | Upper cushion body | 55 | 133 | 8 | 43 | 35 | 250 |
|  | Lower cushion body | 58 | 38 | 4 | 22 | 215 |  |
| Example 3 | Upper cushion body | 56 | 142 | 8 | 39 | 55 | 250 |
|  | Lower cushion body | 55 | 44 | 4 | 23 | 195 |  |
| Example 4 | Upper cushion body | 58 | 139 | 8 | 38 | 80 | 250 |
|  | Lower cushion body | 54 | 43 | 4 | 25 | 170 |  |
| Example 5 | Upper cushion body | 57 | 138 | 8 | 36 | 100 | 250 |
|  | Lower cushion body | 56 | 39 | 4 | 26 | 150 |  |
| Example 6 | Upper cushion body | 55 | 145 | 8 | 36 | 80 | 250 |
|  | Lower cushion body | 82 | 35 | 4 | 15 | 170 |  |
| Example 7 (with cover) | Upper cushion body | 58 | 139 | 8 | 38 | 80 | 250 |
|  | Lower cushion body | 54 | 43 | 4 | 25 | 170 |  |
| Comparative example 1 | Upper cushion body | 54 | Free of high-density layer | Free of high-density layer | 38 | 80 | 250 |
|  | Lower cushion body | 55 | Free of high-density layer | Free of high-density layer | 26 | 170 |  |
| Reference example 1 | Single-layer cushion body | 56 | 136 | 8 | 26 | 250 | ← |
| Reference example 2 | Single-layer cushion body | 81 | 125 | 6 | 19 | 250 | ← |

In each of the mattresses (mattress core materials) of Examples 1 to 7, Comparative example 1, and Reference examples 1 and 2 having structural features as shown in Table 1, its repulsion force under compression at planar load has been determined by measurement using the following testing method (C) as has been discussed in the description of the embodiments.

(C) Repulsion Force Under Compression at Planar Load

Just as in the case of determining "compressive deformation rate" of the cushion body, a sample is cut from the mattress core material or the mattress with cover (Example 7) in a direction parallel to the thickness direction thereof in the form of a rectangular prism having a 150 mm square shaped upper surface (top face). Then, a loading element having a 150 mm square shaped pressurizing plate at a front end thereof is placed on the upper surface of the sample, with the pressurizing plate snugly aligned with the upper surface, and, a load of 5 N is applied to the loading element to determine an initial thickness L4 (mm) of the sample at the load of 5 N. Subsequently, the load applied to the loading element is increased at a rate of 20 N per second to compress the sample in the thickness direction thereof. Upon detection of a 15 mm decrease of the thickness (mm) of the compressed sample from the initial thickness L4 (when the thickness reaching a [L4−15] level), the value of a load L5 (N) applied to the loading element is recorded. This load value L5 is defined as the repulsion force under compression at planar load (N).

Similarly, in each of the mattress core materials of Examples 1 to 7, Comparative example 1, and Reference examples 1 and 2, the index of repulsion force at local load has been determined by measurement using the following testing method (D) as has been discussed in the description of the embodiments.

(D) Index of Repulsion Force at Local Load

Just as in the case of determining the repulsion force under compression at planar load, a sample is cut from the shaped upper surface (top face). Then, a cylindrical loading element having a 50 mm diameter front end is brought into contact with the center of the upper surface of the sample, and, a load of 5 N is applied to the loading element to determine an initial thickness L6 (mm) of the sample. Subsequently, the load applied to the loading element is increased at a rate of 20 N per second to compress the sample in the thickness direction thereof. Upon detection of a 25% decrease of the thickness (mm) of the compressed sample from the initial thickness L6 (when the thickness reaching a [L6×0.75] level), the value of a load L7 applied to the loading element is recorded as a 25% repulsion force (N), and, upon further detection of a 50% decrease of the thickness (mm) of the compressed sample from the initial thickness L6 (when the thickness reaching a [L6×0.5] level), the value of a load L8 applied to the loading element is recorded as a 50% repulsion force (N). The ratio of the 50% repulsion force (N) to the 25% repulsion force (N) [L8/L7] is defined as the index of repulsion force at local load.

A summary of test results is shown in "Table 2" to be hereafter referred to. Table 2 also provides a listing of the separately measured mean apparent density (kg/m$^3$) of the entire mattress and thickness (mm) of the stress distribution layer (high-density intermediate layer X) that is responsible for elimination of the hitting-a-floor feeling.

Moreover, (Rating) as written along with numerical data in the table indicates sensory rating based on the degrees of "hitting-a-floor feeling" and "body pressure-distributing performance" tested by a male model user 65 kg in weight and 170 cm in height. As shown in FIG. 8, when standing with his knees on each mattress placed on a bed, the product tester rated the mattress in respect of the hitting-a-floor feeling (pain, etc.) caused at his knees by the mattress or the top board of the bed on the following scale from (1) to (3):

(1) "Very Good": Test sample which caused absolutely no pain, etc. resulting from reaction force from bed's top board;

(2) "Good": Test sample which caused a little impact resulting from reaction force from bed's top board at acceptable level; and
(3) No Good: Test sample which caused impact (pain) resulting from reaction force from bed's top board.

Figure 11:
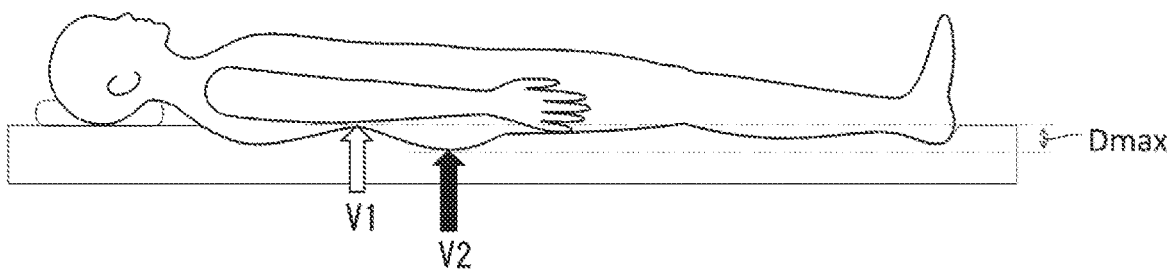
FIG. 11 is a schematic view showing the height (depth) of depression of a mattress on which a person lies on his/her back.

Moreover, as shown in FIG. 11, when lying on his back on each mattress placed on a bed, the product tester rated the mattress in respect of a sense of tight pressure, etc. caused at his shoulder (shoulder blade) and buttocks by the mattress on the following scale from (1) to (3):
(1) "Very Good": Test sample which caused absolutely no sense of tight pressure, etc.;
(2) "Good": Test sample which caused a little sense of tight pressure, etc. at acceptable level; and
(3) No Good: Test sample which caused a sense of tight pressure, etc.

The evaluation results are listed in Table 2.

associated with the hitting-a-floor feeling falls in the range of 2.5 to 6.5, and the repulsion force under compression at planar load associated with body pressure distribution falls in the range of 100 N to 400 N (a range of 200 N to 300 N in this case), and that each example has been rated "Good" or "Very Good" in the sensory evaluation by the product tester. In conclusion, each of the mattresses of Examples 1 to 7 achieves an excellent balance of satisfaction in comfortable sleeping (adequate body pressure distribution) and minimization of the hitting-a-floor feeling that occurs, for example, when a user is standing with his/her knees on the mattress.

Each of the mattresses of Examples 2 to 4, in particular, in which the index of repulsion force at local load associated with the hitting-a-floor feeling falls in a range of 3.0 to 5.0, has been highly regarded in comprehensive evaluation, and has thus proven itself a mattress suitable for practical use.

TABLE 2

| | Design | Apparent overall density kg/m³ | (Stress distribution) Thickness of high-density (intermediate) layer | 50% Repulsion force (N) 25% Repulsion force (N) [L8] [L7] |
|---|---|---|---|---|
| Example 1 | Upper cushion body | 56 | 4 mm | 789 |
| | Lower cushion body | | (Intermediate layer) | 316 |
| Example 2 | Upper cushion body | 58 | 4 mm | 812 |
| | Lower cushion body | | (Intermediate layer) | 271 |
| Example 3 | Upper cushion body | 55 | 4 mm | 985 |
| | Lower cushion body | | (Intermediate layer) | 259 |
| Example 4 | Upper cushion body | 55 | 4 mm | 1286 |
| | Lower cushion body | | (Intermediate layer) | 257 |
| Example 5 | Upper cushion body | 56 | 4 mm | 702 |
| | Lower cushion body | | (Intermediate layer) | 251 |
| Example 6 | Upper cushion body | 73 | 4 mm | 1569 |
| | Lower cushion body | | (Intermediate layer) | 253 |
| Example 7 (with cover) | Upper cushion body | 53 | 4 mm | 1323 |
| | Lower cushion body | | (Intermediate layer) | 270 |
| Comparative example 1 | Upper cushion body | 55 | Free of high-density layer | 638 |
| | Lower cushion body | | | 304 |
| Reference example 1 | Single-layer cushion body | 56 | 2 mm (Upper surface layer) | 655 285 |
| Reference example 2 | Single-layer cushion body | 81 | 2 mm (Upper surface layer) | 1258 572 |

| | (Hitting-a-floor feeling) Index of repulsion force at local load [L8/L7] (Rating) | (Body pressure-distributing performance) Repulsion force under compression at planar load (N: Newton) (Rating) | Comprehensive evaluation |
|---|---|---|---|
| Example 1 | 2.5 (Very Good) | 302 N (Good) | Good |
| Example 2 | 3.0 (Very Good) | 258 N (Very Good) | Very Good |
| Example 3 | 3.8 (Very Good) | 238 N (Very Good) | Very Good |
| Example 4 | 5.0 (Very Good) | 265 N (Very Good) | Very Good |
| Example 5 | 2.8 (Good) | 252 N (Good) | Good |
| Example 6 | 6.2 (Good) | 257 N (Very Good) | Good |
| Example 7 (with cover) | 4.9 (Very Good) | 282 N (Very Good) | Very Good |
| Comparative example 1 | 2.1 (No Good) | 240 N (Very Good) | No Good |
| Reference example 1 | 2.3 (No Good) | 253 N (Very Good) | No Good |
| Reference example 2 | 2.2 (Good) | 512 N (No Good) | No Good |

It will be seen from Table 2 that, in each of the mattress core materials of Examples 1 to 6 and the bed mattress with cover of Example 7, the index of repulsion force at local load As seen from the data about Example 7, in the bed mattress comprising the mattress core materials of Examples 1 to 6 covered with a cover such as the cover 4 or the cover 4' as shown in FIG. 10A or FIG. 10B, the repulsion force under compression at planar load and the index of repulsion force at local load, which have been measured by the testing methods (E) and (F), respectively, stand at substantially the same level as those of Examples 1 to 6 free of cover. It can have also been found that the sample with cover bears comparison with Examples 1 to 6 free of cover in respect of sensory rating based on the degrees of "hitting-a-floor feeling" and "body pressure-distributing performance".

The following may be believed to become involved in the nature of a hard, flat mattress having a high-density intermediate layer such as the bed mattress of the invention having the high-density intermediate layer X.

That is, it is known that the pressure exerted on the body of a user lying on his back on a mattress as shown in FIG. 11 ("repulsion force" of the mattress per unit area), which is a determinant of comfortable sleeping, depends on the height (depth) of depression of the mattress on which a user lies on his/her back.

Figure 12A:
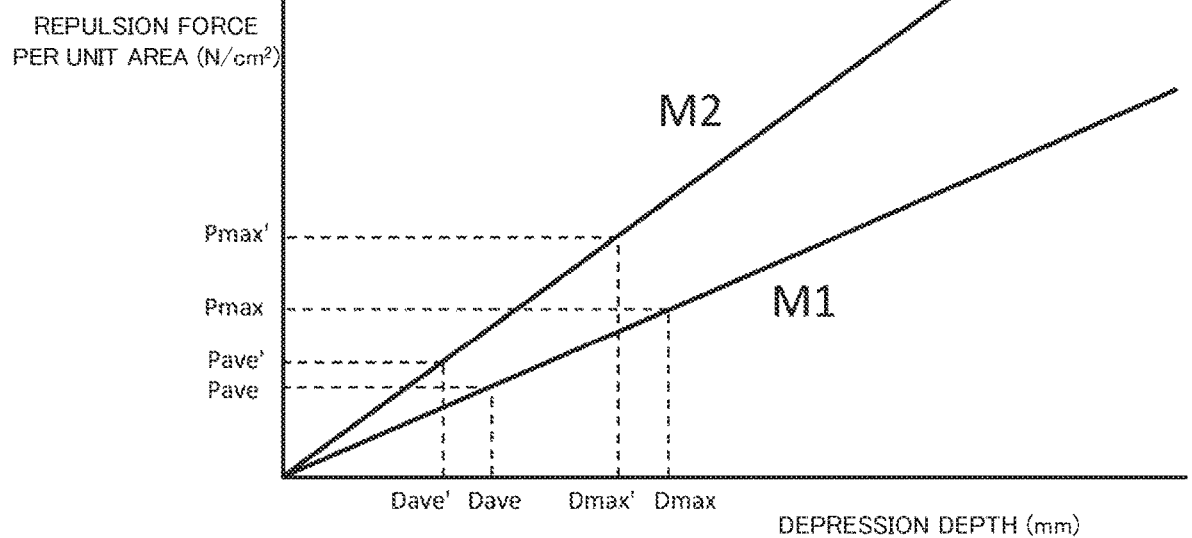
FIG. 12A represents the relationship between the height of depression of the mattress carrying user's body and the repulsion force of the mattress under compression at planar load.

As to the repulsion force of a typical mattress free of a high-density intermediate layer under planar load (the repulsion force under compression at planar load), as seen from the graph shown in FIG. 12A, irrespective of whether the mattress is of a type which undergoes relatively small repulsion force variation (as indicated by a straight line M1) or a type which undergoes relatively large repulsion force variation (as indicated by a straight line M2), in conformity with Hooke's Law, the repulsion force P becomes "zero" in the vicinity of a depression height D of "zero" (corresponding to an area V1 shown in FIG. 11), whereas, the repulsion force P takes on a maximum value [Pmax] in the vicinity of the maximum depression height D [Dmax] (corresponding to an area V2 shown in FIG. 11).

Moreover, an average (normal) depression height of the mattress carrying user's body depends on variation (the rate of variation) in the repulsion force of the mattress, and, the smaller the rate of repulsion force variation, the greater the average depression height. Thus, an average depression height Dave in the mattress which undergoes relatively small repulsion force variation (refer to the straight line M1 shown in FIG. 12A) is greater than an average depression height Dave' in the mattress which undergoes relatively large repulsion force variation (refer to the straight line M2 shown in FIG. 12A).

On the other hand, an average repulsion force of the mattress as observed when user' body sinks down on the mattress depends on the average depression height of the mattress, and, the greater the average depression height, the smaller the average repulsion force (expressed differently, the wider the area of contact between user's body and the mattress under the same body-weight conditions). Thus, an average repulsion force Pave of the mattress which undergoes relatively small repulsion force variation (M1) is smaller than an average repulsion force Pave' of the mattress which undergoes relatively large repulsion force variation (M2).

That is, in a typical mattress, the maximum depression height Dmax, which, properly speaking, varies depending on user's body shape, is about 5 mm to 20 mm greater than the average depression height Dave. Moreover, a difference between Dmax and Dave depends on user's body shape rather than variation in the repulsion force of the mattress, and thus the value of Dmax' is greater than the value of Dave' by an amount which is nearly equal to the difference between Dmax and Dave. It will thus been understood that, only with an increase in the rate of variation in repulsion force, the maximum repulsion force Pmax' of the mattress which undergoes relatively large repulsion force variation (M2) is inevitably greater than the maximum repulsion force Pmax of the mattress which undergoes relatively small repulsion force variation (M1), which leads to poor body pressure-distributing performance.

Figure 12B:
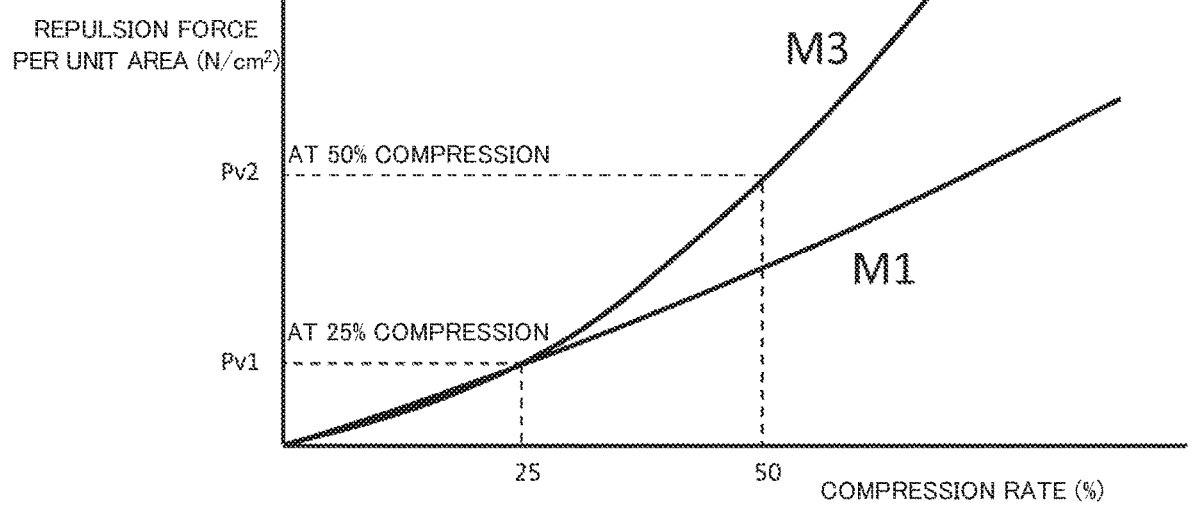
FIG. 12B represents the relationship between the compression rate and the repulsion force under compression at planar load in the mattress.

In contrast to the variation of repulsion force in a typical mattress free of a high-density intermediate layer thus far described, as indicated by a curve M3 shown in FIG. 12B, the repulsion force of the mattress of the invention having the high-density intermediate layer X increases in exponential relation to load.

More specifically, as shown in the graph of FIG. 12B representing the correlation between compression rate (%) and repulsion force, in a typical mattress free of a high-density intermediate layer, in conformity with Hooke's Law by definition, its repulsion force increases in substantially direct proportional relation to load as indicated by a straight line M1 (identical with the straight line M2 shown in FIG. 12A. On the other hand, in the mattress of the invention having the high-density intermediate layer X, as indicated by the curve M3, its repulsion force increases in exponential relation to load. This is ascribable to the placement of the high-density intermediate layer X capable of local load distribution.

As a consequence, in the mattress on which a user is lying on his/her side with his/her arm or waist sinking down on the mattress, in other words, in the mattress which is free from an inverted cone-like deep depression under a slight local load, the effect of comfortable sleeping on a soft place (with low repulsion force) inherent in the three-dimensional filaments-linked structure can be maintained (in conformity with Hooke's Law as indicated by the straight line M1 shown in FIG. 12B).

On the other hand, as shown in FIG. 8, in the mattress of the invention on which a user is standing with his/her knees, in other words, in the mattress under a heavy local load causing an inverted cone-like deep depression, out of the bounds of Hooke's Law, a high repulsion force as indicated by the curve M3 shown in FIG. 12B is produced. This makes it possible to prevent occurrence of "hitting-a-floor feeling" caused by abutment of user's knee, etc. corresponding to the front end of this depression against the top board, etc. of a bed more reliably.

Thus, when subjected to a low, widely applied load (body pressure) during normal use, the bed mattress of the invention having the high-density intermediate layer X accommodates the load in a repulsion force mode obeying Hooke's Law, and, on the other hand, when subjected to a high, narrowly applied load (knee's pressing action, etc.), the mattress accommodates the load with a repulsion force beyond the bounds of normal rule. That is, the mattress of the invention is believed to minimize "hitting-a-floor feeling" by effecting a change in repulsion force mode (mode change) in the middle of exerting repulsion force as above described.

The invention mentioned above in detail may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

Industrial Applicability

The mattress core material of the invention is applicable to a sofa bed or a couch bed in addition to a bed mattress, and may also be used as a cushion material for similar sofa products.

REFERENCE SIGNS LIST

1: Mattress core material
2: Cushion body (upper part)
2A: Upper high-density surface layer
2B: Low-density elastic layer
2C: Lower high-density surface layer
3: Cushion body (lower part)
3A: High-density upper surface layer
3B: Low-density elastic layer
3C: High-density lower surface layer
4, 4': Mattress cover
4a: Surface-side cover
4b: Intermediate cover
4c: Back-side cover
5: Mattress core material
6: Cushion body (upper part)
6A: High-density upper surface layer
6B: Low-density elastic layer
6C: High-density lower surface layer
7: Cushion body (intermediate position)
7A: High-density upper surface layer
7B: Low-density elastic layer
7C: High-density lower surface layer
8: Cushion body (lower part)
8A: High-density upper surface layer
8B: Low-density elastic layer
8C: High-density lower surface layer
100, 101: Bed mattress
X, X1, X2: High-density intermediate layer
Y1, Y2, Y3: Low-density elastic layer (intermediate position)
Z1: Body-pressure support surface layer (high-density upper surface layer)
Z2: Back-side support layer (high-density lower surface layer)
10: Extruder
11: Hopper
12: Screw
13: Screw motor
14: Cylinder
15: Material discharge portion
16: Screw heater
20: Die
20a: Die guide channel
21: Mouthpiece plate
21a: Discharge hole
22: Die heater
22a, 22b, 22c, 22d, 22e, 22f: Die heater
30: Three-dimensional filaments-linked structure-forming section
31: Water tank
31a: Water surface
32, 32A, 32B: Guide plate
33: Water-sprinkling pipe
34, 34A, 34B: Endless conveyor
35A, 35C: Driving roller
35B, 35D: Driven roller
36A, 36B, 36C, 36D, 36E, 36F, 36G, 36H: Conveying roller
41: Mouthpiece plate
41a: Discharge hole
MF: Melted filament
3DF: Three-dimensional filaments-linked structure

The invention claimed is:

1. A mattress core material, comprising:
a plurality of flat cushion bodies stacked in a thickness direction thereof, comprising at least
a first flat cushion body which becomes an upper part when using the mattress core material; and
a second flat cushion body which becomes a lower part when using the mattress core material,
the first flat cushion body and the second flat cushion body comprising a three-dimensional filaments-linked structure in which filaments formed of a melted thermoplastic resin are linked together into a three-dimensional net form,
the first flat cushion body and the second flat cushion body each comprising
a high-density upper surface layer having high filament density, formed in an upper surface layer region in the thickness direction;
a high-density lower surface layer having high filament density, formed in a lower surface layer region in the thickness direction; and
a low-density elastic layer formed between the high-density upper surface layer and the high-density lower surface layer, the low-density elastic layer being lower in filament density than each high-density surface layer,
in the mattress core material in which the first flat cushion body and the second flat cushion body are stacked as upper and lower parts in the thickness direction, respectively, the high-density lower surface layer of the first flat cushion body and the high-density upper surface layer of the second flat cushion body constituting a high-density intermediate layer in an intermediate position of the mattress core material in the thickness direction,
the high-density intermediate layer serving as a stress distribution layer which distributes a vertically applied compressive stress, along a curvature of an interface between the first flat cushion body and the second flat cushion body in the high-density intermediate layer.

2. The mattress core material according to claim 1, wherein at least one high-density surface layer exhibits a rate of compressive deformation of less than 25% which is a result obtained by measurement using the following testing method (A);
(A) A compressive deformation rate:
A sample is prepared by cutting a 2 mm-thick, horizontally sliced piece of the high-density surface layer into a square which is 100 mm on a side, and a measured thickness of the sample in uncompressed condition is defined as a thickness L1 (mm); a loading element having a 100 mm square shaped pressurizing plate at a front end thereof is placed on an upper surface of the sample, with the pressurizing plate snugly aligned with the upper surface; a load of 200 N is applied to the loading element to determine a thickness L2 (mm) of the sample at the load; a percentage of variation in thickness under the planar load $[\{(L1-L2)/(L1)\} \times 100]$ is defined as the compressive deformation rate (%).

3. The mattress core material according to claim 1, wherein at least one high-density surface layer exhibits an elongation deformation amount of greater than or equal to 10 mm but less than or equal to 150 mm, which is a result obtained by measurement using the following testing method(B);

(B) An elongation deformation amount:

A sample is prepared by cutting a 2 mm-thick, horizontally sliced piece of the high-density surface layer into a 400 mm diameter circle; the sample is retained between a pair of frame-shaped plates, each having a 300 mm diameter circular opening, so that part of the sample is exposed in a form of a 300 mm diameter circle (2 mm in thickness) inside the frame to prepare a test piece; a loading element having a 20 mm diameter circular pressurizing plate at a front end thereof is brought into contact with a center of an upper surface of the circular sample inside the frame; a load of 100 N is applied to the loading element to deform a central area of the circular sample into a concave recess; in this condition, a sag amount L3 (mm) of the central area of the circular sample from a level of the frame is measured from a side of the test piece; and the sag amount L3 is defined as the elongation deformation amount (mm).

4. The mattress core material according to claim 1, wherein an apparent density of at least one high-density surface layer obtained by calculation using the following equation (1) falls in a range of 60 kg/m$^3$ to 300 kg/m$^3$, and an apparent density of at least one low-density elastic layer obtained by calculation using the following equation (1) falls in a range of 30 kg/m$^3$ to 155 kg/m$^3$, and a mean apparent density of the upper first flat cushion body obtained by calculation using the following equation (1) falls in a range of 35 kg/m$^3$ to 150 kg/m$^3$, and a mean apparent density of the lower second flat cushion body obtained by calculation using the following equation (1) falls in a range of 35 kg/m$^3$ to 150 kg/m$^3$, $$G=w/(v \times d \times h) \quad (1),$$

wherein G represents apparent density (kg/m$^3$), w represents sample mass (kg), v represents sample width (m), d represents sample depth (m), and h represents sample height (m).

5. The mattress core material according to claim 1, wherein the mattress core material in which the first flat cushion body and the second flat cushion body are stacked in the thickness direction, exhibits a repulsion force under compression at planar load of greater than or equal to 100 N but less than or equal to 400 N, which is a result obtained by measurement using the following testing method (C), and exhibits an index of repulsion force at local load of greater than or equal to 2.5 but less than or equal to 6.5, which is a result obtained by measurement using the following testing method (D);

(C) A repulsion force under compression at planar load:

A sample is cut from the mattress core material in a direction parallel to the thickness direction in a form of a rectangular prism having a 150 mm square shaped upper surface (top face); a loading element having a 150 mm square shaped pressurizing plate at a front end thereof is placed on the upper surface of the sample, with the pressurizing plate snugly aligned with the upper surface; a load of 5 N is applied to the loading element to determine an initial thickness L4 (mm) of the sample at the load of 5 N; the sample is compressed in the thickness direction by increasing the load applied to the loading element at a rate of 20 N per second; upon detection of a 15 mm decrease of the thickness (mm) of the compressed sample from the initial thickness L4, expressed differently, when the thickness reaching a [L4−15] level, a value of a load L5 (N) applied to the loading element is recorded; the load value L5 is defined as the repulsion force under compression at planar load (N);

(D) An index of repulsion force at local load:

A sample is cut from the mattress core material in a direction parallel to the thickness direction in a form of a rectangular prism having a 300 mm square shaped upper surface (top face); a cylindrical loading element having a 50 mm diameter front end is brought into contact with a center of the upper surface of the sample, a load of 5 N is applied to the loading element to determine an initial thickness L6 (mm) of the sample; the sample is compressed in the thickness direction by increasing the load applied to the loading element at a rate of 20 N per second; upon detection of a 25% decrease of the thickness (mm) of the compressed sample from the initial thickness L6, expressed differently, when the thickness reaching a [L6×0.75] level, a value of a load L7 applied to the loading element is recorded as a repulsion force under 25% compression at local load (N); upon further detection of a 50% decrease of the thickness (mm) of the compressed sample from the initial thickness L6, expressed differently, when the thickness reaching a [L6×0.5] level, a value of a load L8 (N) applied to the loading element is recorded as a repulsion force under 50% compression at local load (N); and a ratio of the repulsion force under 50% compression at local load L8 (N) to the repulsion force under 25% compression at local load L7 (N) [L8/L7] is defined as the index of repulsion force at local load.

6. A bed mattress, comprising:
the mattress core materials stacked in the thickness direction according to claim 1; and
a cover which receives the mattress core materials.

7. The bed mattress according to claim 6, wherein the bed mattress in which the first flat cushion body and the second flat cushion body are stacked in the thickness direction, with the cover lying in between, exhibits a repulsion force under compression at planar load of greater than or equal to 100 N but less than or equal to 400 N, which is a result of measurement using the following testing method (E), and exhibits an index of repulsion force at local load of greater than or equal to 2.5 but less than or equal to 6.5, which is a result of measurement using the following testing method (F);

(E) A repulsion force under compression at planar load:

A sample is cut from the mattress core material with the cover inclusive vertically in the thickness direction in a form of a rectangular prism having a 150 mm square shaped upper surface (top face); a loading element having a 150 mm square shaped pressurizing plate at a front end thereof is placed on the upper surface of the sample, with the pressurizing plate snugly aligned with the upper surface; a load of 5 N is applied to the loading element to determine an initial thickness L9 (mm) of the sample; the sample is compressed in the thickness direction by increasing the load applied to the loading element at a rate of 20 N per second; upon detection of a 15 mm decrease of the thickness (mm) of the compressed sample from the initial thickness L9, expressed differently, when the thickness reaching a [L9−15] level, a value of a load L10 (N) applied to the loading element is recorded; the load value L10 is defined as the repulsion force under compression at planar load (N);

(F) An index of repulsion force at local load:

A sample is cut from the mattress core material with the cover inclusive vertically in the thickness direction in a form of a rectangular prism having a 300 mm square shaped upper surface (top face); a cylindrical loading element having a 50 mm diameter front end is brought into contact with a center of the upper surface of the sample; a load of 5 N is applied to the loading element to determine an initial thickness L11 (mm) of the sample. The sample is compressed in the thickness direction by increasing the load applied to the loading element at a rate of 20 N per second; upon detection of a 25% decrease of the thickness (mm) of the compressed sample from the initial thickness L11, expressed differently, when the thickness reaching a [L11 x 0.75] level, a value of a load L12 applied to the loading element is recorded as a repulsion force under 25% compression at local load (N); upon further detection of a 50% decrease of the thickness (mm) of the compressed sample from the initial thickness L11, expressed differently, when the thickness reaching a [L11×0.5] level, a value of a load L13 (N) applied to the loading element is recorded as a repulsion force under 50% compression at local load (N); and a ratio of the repulsion force under 50% compression at local load L13 (N) to the repulsion force under 25% compression at local load L12 (N) [L13/L12] is defined as the index of repulsion force at local load.

\* \* \* \* \*